(12) United States Patent
Fujikura et al.

(10) Patent No.: US 9,519,124 B2
(45) Date of Patent: Dec. 13, 2016

(54) SINGLE FOCAL LENGTH LENS SYSTEM AND IMAGE PICKUP APPARATUS USING THE SAME

(71) Applicant: OLYMPUS CORPORATION, Tokyo (JP)

(72) Inventors: Takashi Fujikura, Tokyo (JP); Kazuteru Kawamura, Tokyo (JP)

(73) Assignee: Olympus Corporation, Tokyo (JP)

( * ) Notice: Subject to any disclaimer, the term of this patent is extended or adjusted under 35 U.S.C. 154(b) by 93 days.

(21) Appl. No.: 14/522,128

(22) Filed: Oct. 23, 2014

(65) Prior Publication Data

US 2015/0109519 A1    Apr. 23, 2015

(30) Foreign Application Priority Data

Oct. 23, 2013 (JP) .................. 2013-220518

(51) Int. Cl.
| | | |
|---|---|---|
| G02B 15/14 | (2006.01) | |
| G02B 13/02 | (2006.01) | |
| G02B 27/64 | (2006.01) | |
| G02B 9/64 | (2006.01) | |

(52) U.S. Cl.
CPC .................. *G02B 13/02* (2013.01); *G02B 9/64* (2013.01); *G02B 27/646* (2013.01)

(58) Field of Classification Search
CPC .................................................. G02B 15/173
USPC ........................................................ 359/684
See application file for complete search history.

(56) References Cited

U.S. PATENT DOCUMENTS

2013/0120640 A1*  5/2013  Taki ...................... G02B 15/14
                                                          348/345

FOREIGN PATENT DOCUMENTS

| JP | 11-160617 | 6/1999 |
| JP | 2008-145584 | 6/2008 |

* cited by examiner

*Primary Examiner* — James Jones
(74) *Attorney, Agent, or Firm* — Andrews Kurth Kenyon LLP

(57) ABSTRACT

A single focal length lens system includes a front lens unit having a positive refractive power, and a rear lens unit. The front lens unit includes a first lens unit having a positive refractive power, a second lens unit having a negative refractive power, and a third lens unit having a positive refractive power, and both the first lens unit and the second lens unit include a positive lens and a negative lens. The rear lens unit includes a focusing lens unit and a first predetermined lens unit. The first predetermined lens unit has a refractive power having a sign different from a refractive power of the focusing lens unit, and does not move at the time of focusing. The front lens unit does not include a lens which moves, and the rear lens unit does not include a lens which moves except at the time of focusing.

46 Claims, 12 Drawing Sheets

435.84 — — —
486.13 —·—·—
656.27 - - - - -
587.56 ———

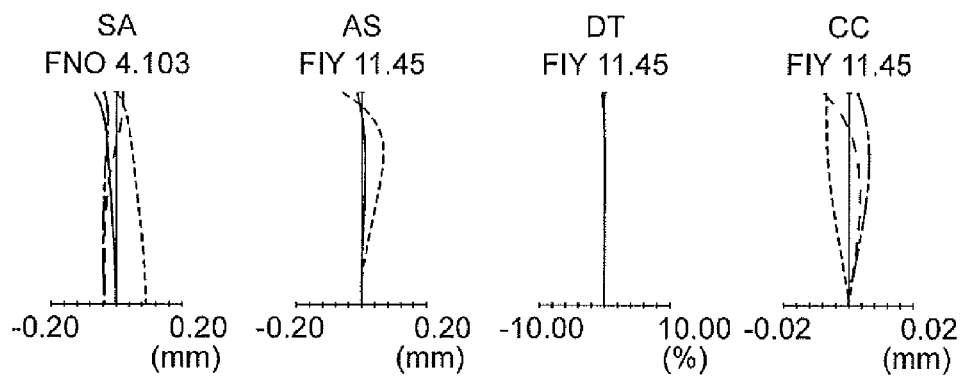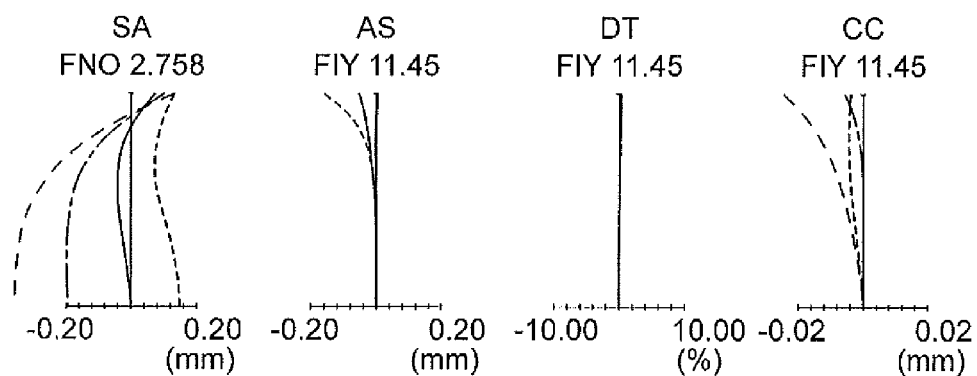

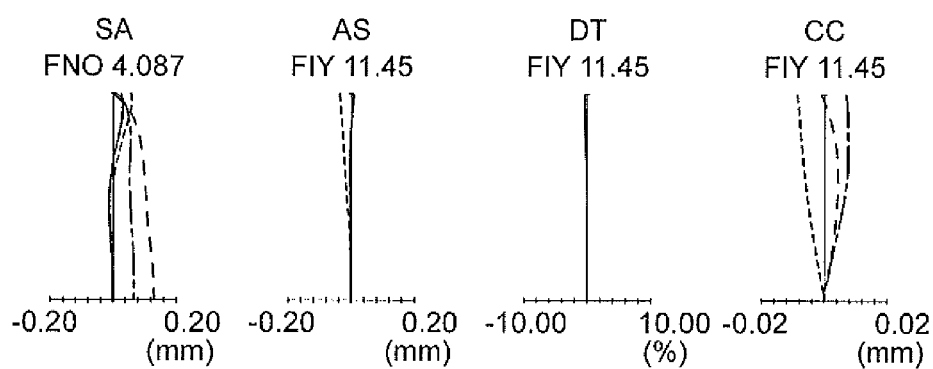
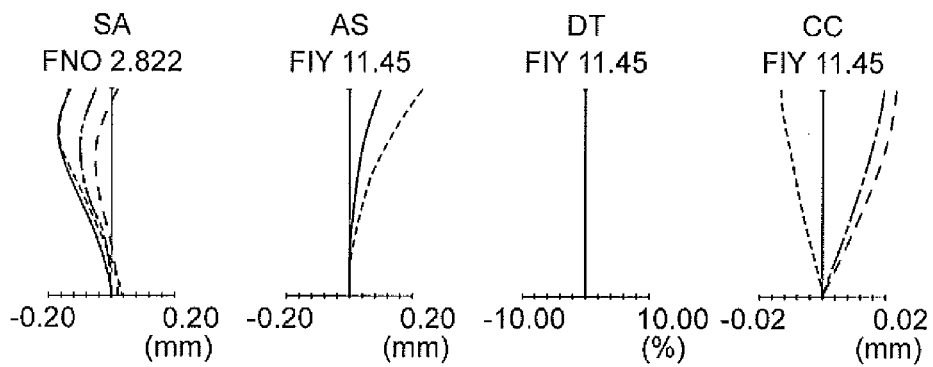

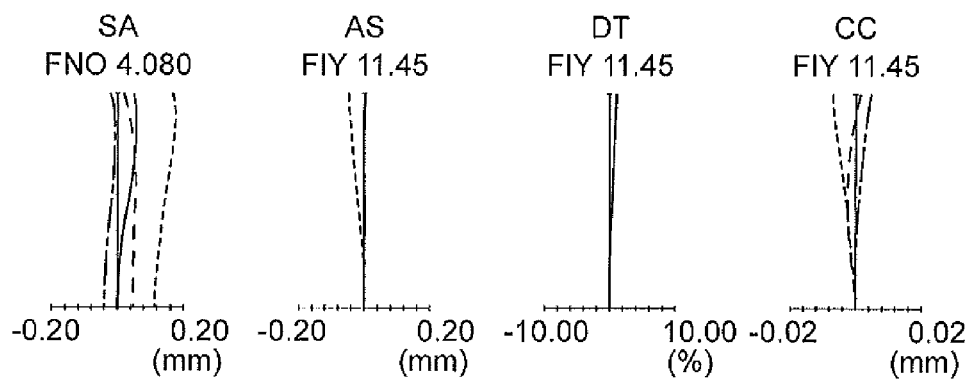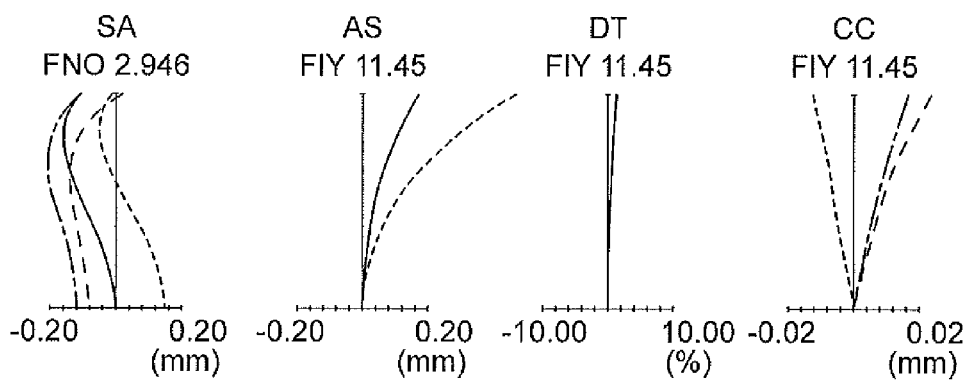

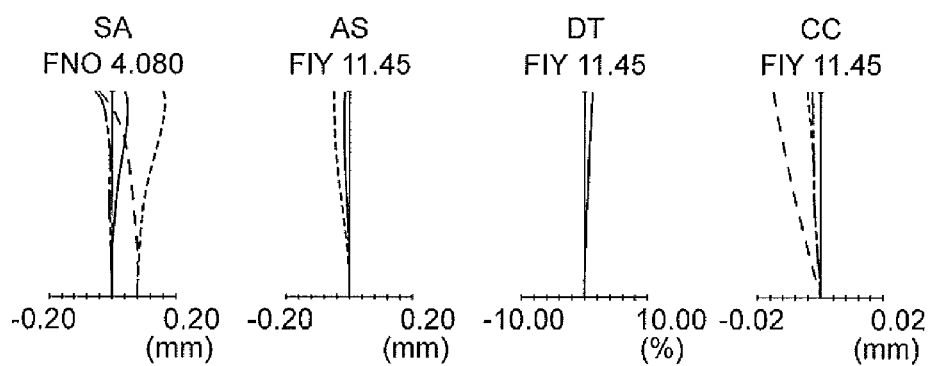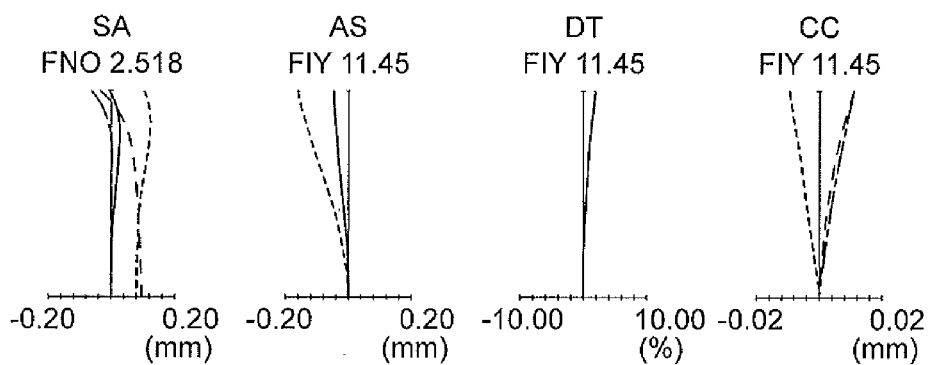

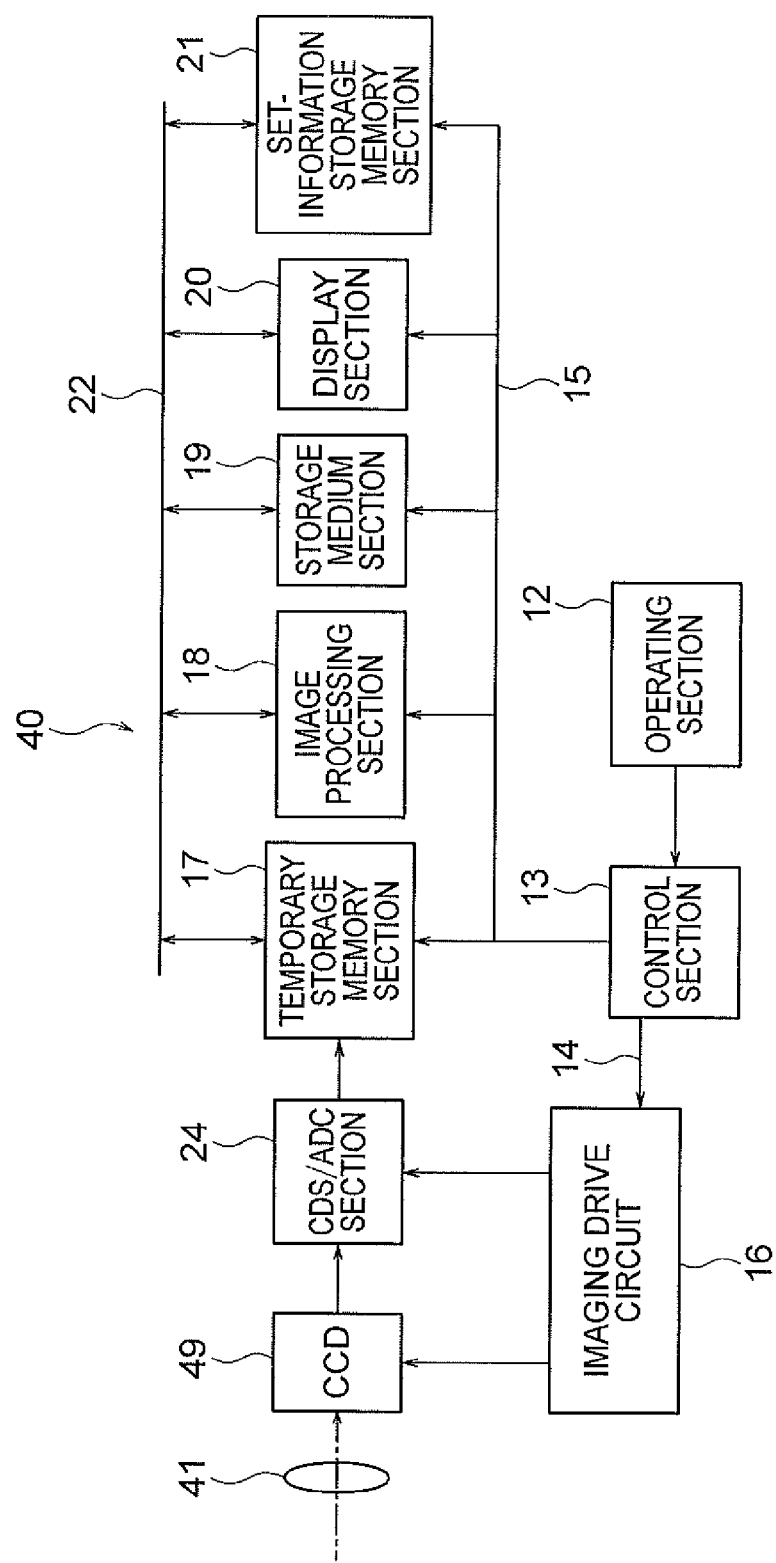

SINGLE FOCAL LENGTH LENS SYSTEM AND IMAGE PICKUP APPARATUS USING THE SAME

CROSS-REFERENCE TO RELATED APPLICATION

The present application is based upon and claims the benefit of priority from the prior Japanese Patent Application No. 2013-220518 filed on Oct. 23, 2013; the entire contents of which are incorporated herein by reference.

BACKGROUND OF THE INVENTION

Field of the Invention

The present invention relates to a single focal length lens system, and an image pickup apparatus using the same.

Description of the Related Art

In a photography in which, a telephoto lens or an ultra-telephoto lens (hereinafter, appropriately let to be telephoto lens) is used, an effect of drawing a distant object or a small object in front of an eye of a photographer is achieved. Therefore, the telephoto lens has widely been used in photography of various scenes such as photography of sport scenes, photography of wild animals such as wild birds, and photography of astronomical bodies.

As a telephoto lens to be used for photography of such scenes, telephoto lenses disclosed in Japanese Patent Application Laid-open Publication Nos. 2008-145584 and Hei 11-160617 are available.

In the photography of abovementioned scenes, relative merits of mobility of an image pickup apparatus become important. Here, the mobility refers to an ease of carrying, a stability at the time of hand-held photography, and a rapidity of focusing speed. For making the mobility of an apparatus superior, an optical system having a small size and light weight is desirable. Moreover, a feature that an optical system is capable of focusing an object rapidly is an important feature that decides the relative merits of mobility.

SUMMARY OF THE INVENTION

A single focal length lens system according to the present invention includes in order from an object side to an image side along an optical axis, a front lens unit having a positive refractive power, and
a rear lens unit, wherein the front lens unit includes in order from the object side to the image side, a first lens unit having a positive refractive power, a second lens unit having a negative refractive power, and a third lens unit having a positive refractive power, and both the first lens unit and the second lens unit include a positive lens and a negative lens, and the rear lens unit includes in order from the object side to the image side, a focusing lens unit and a first predetermined lens unit, and the focusing lens unit moves along the optical axis at the time of focusing from an object at infinity to an object at a close distance, and the first predetermined lens unit has a refractive power having a sign different from a sign of a refractive power of the focusing lens unit, and does not move in an optical axial direction at the time of focusing, and the front lens unit does not include a lens which moves in the optical axial direction, and the rear lens unit does not include a lens which moves in the optical axial direction except at the time of focusing.

Moreover, an image pickup apparatus according to the present invention includes;

an optical system, and an image pickup element which has an image pickup surface, and which converts an image formed on the image pickup surface by the optical system to an electric signal, wherein the optical system is the abovementioned single focal length lens system.

BRIEF DESCRIPTION OF THE DRAWINGS

FIG. 1A is a lens cross-sectional view of a single focal length lens system according to an example 1, and FIG. 1B is a lens cross-sectional view of a single focal length lens system according to an example 2;

FIG. 2A is a lens cross-sectional view of a single focal length lens system according to an example 3, and FIG. 2B is a lens cross-sectional view of a single focal length lens system according to an example 4;

FIG. 5A, FIG. 5B, FIG. 5C, and FIG. 5D are aberration diagrams at the time of focusing at an object at infinity of the single focal length lens system according to the example 2, and FIG. 5E, FIG. 5F, FIG. 5G, and FIG. 5H are aberration diagrams at the time of focusing at an object at a close distance of the single focal length lens system according to the example 2;

FIG. 6A, FIG. 6B, FIG. 6C, and FIG. 6D are aberration diagrams at the time of focusing at an object at infinity of the single focal length lens system according to the example 3, and FIG. 6E, FIG. 6F, FIG. 6G, and FIG. 6H are aberration diagrams at the time of focusing at an object at a close distance of the single focal length lens system according to the example 3;

FIG. 7A, FIG. 7B, FIG. 7C, and FIG. 7D are aberration diagrams at the time of focusing at an object at infinity of the single focal length lens system according to the example 4, and FIG. 7E, FIG. 7F, FIG. 7G, and FIG. 7H are aberration diagrams at the time of focusing at an object at a close distance of the single focal length lens system according to the example 4;

FIG. 8A, FIG. 8B, FIG. 8C, and FIG. 8D are aberration diagrams at the time of focusing at an object at infinity of the single focal length lens system according to the example 5, and FIG. 8E, FIG. 8F, FIG. 8G, and FIG. 8H are aberration diagrams at the time of focusing at an object at a close distance of the single focal length lens system according to the example 5;

FIG. 12 is a schematic block diagram of an internal circuit of main components of the digital camera.

DETAILED DESCRIPTION OF THE INVENTION

Figure 1A:
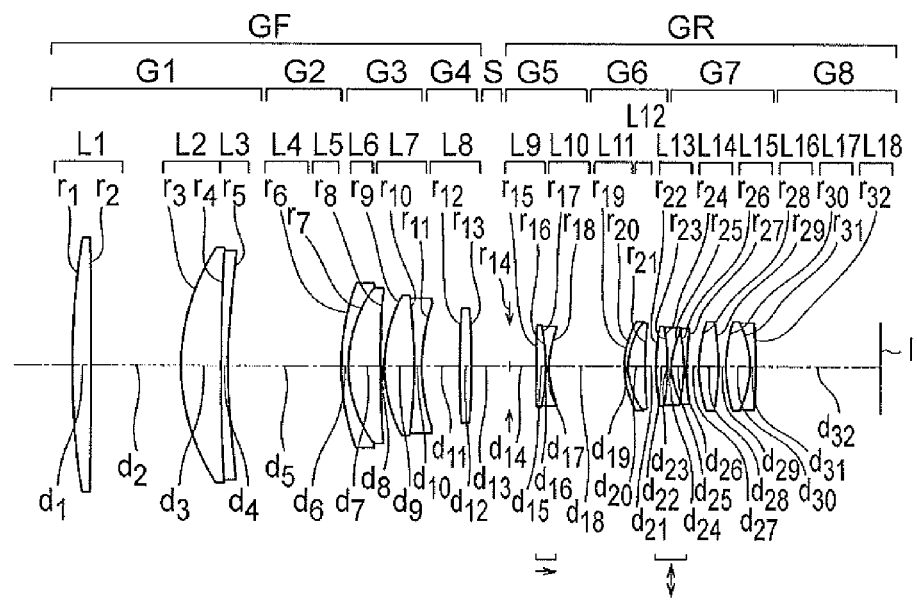
FIG. 1A and FIG. 1B are lens cross-sectional views at the time of focusing at an object at infinity of a single focal length lens systems according to the present invention, where.

Exemplary embodiments and examples of a single focal length lens system, and an image pickup apparatus using the same according to the present invention will be described below in detail by referring to the accompanying diagrams. However, the present invention is not restricted to the embodiments and the examples described below.

A single focal length lens system according to the present embodiment includes in order from an object side to an image side, a front lens unit having a positive refractive power, and a rear lens unit, and the front lens unit includes in order from the object side to the image side, a first lens unit having a positive refractive power, a second lens unit having a negative refractive power, and a third lens unit having a positive refractive power, and both the first lens unit and the second lens unit include a positive lens and a negative lens, and the rear lens unit includes in order from the object side to the image side, a focusing lens unit and a first predetermined lens unit, and the focusing lens unit moves along the optical axis at the time of focusing from an object at infinity to an object at a close distance, and the first predetermined lens unit has a refractive power having a sign different from a sign of a refractive power of the focusing lens unit, and does not move in an optical axial direction at the time of focusing, and the front lens unit does not include a lens which moves in the optical axial direction, and the rear lens unit does not include a lens which moves in the optical axial direction except at the time of focusing.

For shortening the overall length of the lens system, it is necessary to arrange the single focal length lens system (hereinafter, appropriately referred to as 'lens system') to include a telephoto arrangement, as well as to enhance an effect attributed to the telephoto arrangement (hereinafter, appropriately referred to as 'effect due to the telephoto arrangement'). For enhancing the effect due to the telephoto arrangement, in the front lens unit which is disposed nearest to the object side, the first lens unit having a positive refractive power is disposed, and the second lens unit having a negative refractive power is disposed on the image side thereof. Accordingly, correction of a spherical aberration, a coma, and an astigmatism becomes possible mainly, while enhancing the effect due to the telephoto arrangement.

Moreover, by letting an arrangement which includes the third lens unit having a positive refractive power, a height from an optical axis of a light ray incident on the rear lens unit decreases. Accordingly, small-sizing of a lens in the rear lens unit including the focusing lens unit is possible.

Moreover, by the first lens unit and the second lens unit including at least the positive lens and the negative lens, it is possible to suppress an occurrence of a chromatic aberration and the astigmatism in each lens unit.

Moreover, the focusing lens unit is disposed in the rear lens unit, and the focusing lens unit moves along the optical axis at the time of focusing from an object at infinity to an object at a close distance. By making such an arrangement, it is possible to carry out focusing by the rear lens unit. As a result, it is possible to make a diameter of the focusing lens unit small. Moreover, since it is possible to make the diameter of the focusing lens unit small, it is also possible to make the diameter of the focusing unit (an arrangement including the focusing lens unit and a moving mechanism) extremely small. Although it is preferable that there is at least one focusing lens unit, there may be a plurality of focusing lens units.

Moreover, the rear lens unit includes the first predetermined lens unit. Here, the first predetermined lens unit has a refractive power having a sign different from a sign of the refractive power of the focusing lens unit. For instance, in a case in which, the refractive power of the focusing lens unit is a negative refractive power, the refractive power of the first predetermined lens unit is a positive refractive power. By disposing the first predetermined lens unit in the rear lens unit, it is possible to enhance the magnification of the focusing lens unit. As a result, it is possible to reduce an amount of movement of the focusing lens unit at the time of focusing.

Moreover, the first predetermined lens unit does not move in the optical axial direction at the time of focusing. In other words, the first predetermined lens unit is stationary at the time of focusing. By making such an arrangement, it is possible to reduce the number of lens units which move at the time of focusing.

Moreover, the front lens unit does not include a lens which moves in the optical axial direction. In other words, the front lens unit is stationary all the time. A reason for making such an arrangement will be described below. When an attempt is made to carry out focusing, zooming, or image stabilization by a lens (lens unit) in the front lens unit, a lens in the front lens unit is to be moved. However, as aforementioned, the effect due to the telephoto arrangement has been enhanced in the front lens unit. Therefore, if a lens in the front lens unit is moved, a large spherical aberration, coma, and astigmatism occur (fluctuate) with the movement of the lens.

Moreover, since a light ray height being high in the front lens unit, an amount of occurrence of the aberrations becomes large as compared to an amount of occurrence of aberrations in the rear lens unit. Accordingly, if a lens in the front lens unit is moved, the imaging performance is degraded. For preventing degradation of the imaging performance, it is necessary to reduce the occurrence of (fluctuation in) these aberrations.

Thus, if an attempt is made to move a lens in the front lens unit, it is necessary to achieve both of maintaining the effect due to the telephoto arrangement and an aberration correction in the front lens unit. Therefore, by not disposing a lens that moves in the front lens unit, a proportion of load of aberration correction in the front lens unit is reduced. As a result, in the front lens unit, it is possible to enhance the effect due to the telephoto arrangement.

Moreover, the rear lens unit does not include a lens which moves in the optical axial direction except at the time of focusing. By making such an arrangement, it is possible to simplify the arrangement of the rear lens unit.

Moreover, according to a preferable aspect of the present invention, it is desirable that the rear lens unit has a negative refractive power as a whole.

Accordingly, the arrangement of the lens system becomes an arrangement including in order from the object side to the image side, a front lens unit having a positive refractive power and a rear lens unit having a negative refractive power. Therefore, since the effect due to the telephoto arrangement has been enhanced, it is possible to shorten the overall length of the lens system. Moreover, by making such an arrangement, it is possible to correct mainly the spherical aberration, the coma, and the astigmatism favorably, while enhancing the effect due to the telephoto arrangement.

According to a preferable aspect of the present invention, it is desirable that no other lens is disposed between the third lens unit and the focusing lens unit.

Accordingly, it is possible to make a lens diameter small in a lens unit on the image side of an aperture stop. Moreover, due to the positive refractive power of the third lens unit and the negative refractive power of the focusing lens unit, it is possible to enhance further the effect due to the telephoto arrangement.

According to a preferable aspect of the present invention, it is desirable that single focal length lens system includes an aperture stop which is disposed between the third lens unit and the focusing lens unit.

Accordingly, it is possible to make a lens diameter small in the lens units on the image side of the aperture stop.

Moreover, according to a preferable aspect of the present invention, it is desirable that the following conditional expression (1) is satisfied:

$$0.20 < f_{FF}/f < 0.90 \tag{1}$$

where, $f_{FF}$ denotes a focal length of the front lens unit, and
$f$ denotes a focal length of the single focal length lens system at the time of focusing at an object at infinity.

When falling below a lower limit value of conditional expression (1), it is advantageous for shortening the overall length of the lens system, but the refractive power of the first lens unit and the third lens unit in the front lens unit having a large aperture becomes large. As the refractive power of the first lens unit and the third lens unit becomes large, since a radius of curvature of lenses in the first lens unit and the third lens unit becomes small, a volume of the lenses increases. Since a weight of a lens with a large aperture increases due to the increase in volume, making the overall lens unit light-weight becomes difficult.

When exceeding an upper limit value of conditional expression (1), since the refractive power of the front lens unit becomes small, shortening the overall length of the lens system becomes difficult.

Moreover, according to a preferable aspect of the present invention, it is desirable that the following conditional expression (2) is satisfied:

$$0.30 < |f_{G1}/f_{G2}| < 2.00 \tag{2}$$

where, $f_{G1}$ denotes a focal length of the first lens unit, and
$f_{G2}$ denotes a focal length of the second lens unit.

When falling below a lower limit value of conditional expression (2), the refractive power of the first lens unit having a large aperture becomes excessively large. In this case, a proportion of the refractive power of the first lens unit to the refractive power of the overall lens unit becomes large. As the proportion becomes large, since a radius of curvature of a lens in the first lens unit becomes small, a volume of the lens increases. Therefore, since a weight of the lens having a large aperture increases, it becomes difficult to make the overall lens unit light-weight.

When exceeding an upper limit value of conditional expression (2), since a proportion of the refractive power of the second lens unit becomes excessively large, it becomes difficult to shorten the overall length of the lens system.

Moreover, according to a preferable aspect of the present invention, it is desirable that the following conditional expression (3) is satisfied:

$$-2.50 < f_{G2}/f < -0.10 \tag{3}$$

where, $f_{G2}$ denotes the foal length of the second lens unit, and
$f$ denotes the focal length of the single focal length lens system at the time of focusing at an object at infinity.

When falling below a lower limit value of conditional expression (3), since the refractive power of the second lens unit becomes small, the effect due to the telephoto arrangement becomes weak. When shortening the overall length of the lens system is taken into consideration, it is desirable to make the negative refractive power large and to enhance the effect due to the telephoto arrangement. Here, if the negative refractive power of the second lens unit becomes excessively small, it is necessary to make large the refractive power of the focusing lens unit which is a negative refractive power. However, if the negative refractive power of the focusing lens unit is made large, an aberration fluctuation at the time of focusing becomes large. Moreover, since the number of lenses in the focusing lens unit increases, making the focusing lens unit light-weight becomes difficult.

When exceeding an upper limit value of conditional expression (3), since the refractive power of the second lens unit becomes excessively large, the height from the optical axis of a light ray incident on the rear lens unit increases. Accordingly, a lens diameter of a lens in the rear lens unit including the focusing lens unit becomes large.

Moreover, according to a preferable aspect of the present invention, it is desirable that the following conditional expression (4) is satisfied:

$$0 < MG_{G2} \tag{4}$$

where, $MG_{G2}$ denotes a lateral magnification of the second lens unit at the time of focusing at an object at infinity.

When falling below a lower limit value of conditional expression (4), since the refractive power of the second lens unit becomes large, correction of the spherical aberration and the astigmatism becomes difficult. Moreover, since a light beam emerged from the second lens unit is diverged, a lens diameter in the rear lens unit becomes large. Therefore, small-sizing of a lens unit positioned on the image side of the second lens unit becomes difficult.

Moreover, according to a preferable aspect of the present invention, it is desirable that the following conditional expression (5) is satisfied:

$$0.20 < f_{FF}/f_{G3} < 2.00 \tag{5}$$

where, $f_{FF}$ denotes the focal length of the front lens unit, and
$f_{G3}$ denotes a focal length of the third lens unit.

When falling below a lower limit value of conditional expression (5), since the refractive power of the third lens unit with respect to the refractive power of the front lens unit becomes small, the height from the optical axis of a light ray incident on the rear lens unit increases. Accordingly, a lens diameter of a lens in the rear lens unit including the focusing lens unit becomes large.

When exceeding an upper limit value of conditional expression (5), since the refractive power of the third lens unit with respect to the refractive power of the front lens unit becomes large, correction of the spherical aberration and a longitudinal chromatic aberration becomes difficult.

Moreover, according to a preferable aspect of the present invention, it is desirable that the rear lens unit includes a focusing lens unit having a negative refractive power which moves along the optical axis at the time of focusing from an object at infinity to an object at a close distance, and a lens unit having a positive refractive power, and only the focusing lens unit moves in the optical axial direction at the time of focusing.

By imparting a focusing function to the rear lens unit, it is possible to make a diameter of the focusing lens unit small. Accordingly, it is possible to make the focusing lens unit small-sized and light-weight. Moreover, by letting focusing lens unit to be a lens unit having a negative refractive power, it is possible to dispose the focusing lens at a position at which, a light ray is in a converged state. Therefore, it is possible to make the lens diameter of the focusing lens unit small, and making the focusing unit (formed by including the focusing lens unit and a moving mechanism) small-sized and light-weight becomes possible.

Moreover, according to a preferable aspect of the present invention, it is desirable that the following conditional expression (6) is satisfied:

$$0.06<|f_{fo}/f|<0.35 \quad (6)$$

where, f denotes the foal length of the single focal length lens system at the time of focusing at an object at infinity, and $f_{fo}$ denotes a focal length of the focusing lens unit.

When falling below a lower limit value of conditional expression (6), since the refractive power of the focusing lens unit becomes large, the spherical aberration occurs at the time of focusing. Moreover, since reduction in the spherical aberration leads to an increase in the number of lenses of the focusing lens unit, making the focusing lens unit light-weight becomes difficult.

When exceeding an upper limit value of conditional expression (6), since the refractive power of the focusing lens unit becomes small, an amount of movement of the focusing lens unit at the time of focusing increases. Therefore, when an attempt is made to secure a space which is necessary for the movement of the focusing lens unit, shortening the overall length of the lens system becomes difficult.

Moreover, according to a preferable aspect of the present invention, it is desirable that the following conditional expression (7) is satisfied:

$$1.60<f_{G2}/f_{fo}<10.0 \quad (7)$$

where, $f_{fo}$ denotes the focal length of the focusing lens unit, and
$f_{G2}$ denotes the focal length of the second lens unit.

When falling below a lower limit value of conditional expression (7), the refractive power of the focusing lens unit becomes excessively small. In this case, the amount of movement of the focusing lens unit at the time of focusing increases. Therefore, when an attempt is made to secure a space which is necessary for the movement of the focusing lens unit, shortening the overall length of the lens system becomes difficult.

When exceeding an upper limit value of conditional expression (7), the refractive power of the second lens unit becomes small. Accordingly, correction of the spherical aberration, the coma, and the astigmatism in the front lens unit becomes difficult. When an attempt is made to correct these aberrations in the rear lens unit, since a proportion of load of correction of the spherical aberration, the coma, and the astigmatism in the focusing lens unit increases, a favorable imaging performance cannot be achieved at the time of focusing.

Moreover, according to a preferable aspect of the present invention, it is desirable that the front lens unit includes a positive lens which satisfies the following conditional expression (8):

$$80<vd_{Fp}<98 \quad (8)$$

where, $vd_{Fp}$ denotes Abbe number for one of the positive lenses in the front lens unit.

The longitudinal chromatic aberration and the chromatic aberration of magnification which occurs in the front lens unit are augmented in the rear lens unit. Therefore, it is necessary to make an amount of the aberration which occurs in the front lens unit to be as small as possible.

When falling below a lower limit value of conditional expression (8), since an amount of chromatic aberration remained in the front lens unit increases, a favorable imaging performance is not achieved. When exceeding an upper limit value of conditional expression (8), since the correction of the chromatic aberration in the front lens unit becomes excessive, a favorable imaging performance is not achieved.

Moreover, according to a preferable aspect of the present invention, it is desirable that the focusing lens unit is the only lens unit which moves along the optical axis at the time of focusing from an object at infinity to an object at a close distance, and the rear lens unit includes a lens unit having a positive refractive power which is disposed on the image side of the focusing lens unit, immediately after the focusing lens unit, and the following conditional expression (9) is satisfied:

$$0.05<f_{Fop}/f<1.00 \quad (9)$$

where, $f_{Fop}$ denotes a focal length of the lens unit having a positive refractive power which is disposed on the image side of the focusing lens unit, immediately after the focusing lens unit, and f denotes the focal length of the single focal length lens system at the time of focusing at an object at infinity.

By disposing the lens unit having a positive refractive power on the image side of the focusing lens unit, since it is possible to enhance a magnification of the focusing lens unit, a focusing sensitivity is improved. Accordingly, since it is possible to reduce the amount of movement of the focusing lens unit at the time of focusing, it is possible to make a focusing speed high.

When falling below a lower limit value of conditional expression (9), the magnification of the focusing lens unit is enhanced, but since the number of lenses in the lens unit having a positive refractive power increases, this leads to an increase in the weight of the lens system.

When exceeding an upper limit value of conditional expression (9), the refractive power of the lens unit having a positive refractive power becomes small. In this case, since it is not possible to enhance the magnification of the focusing lens unit, the amount of movement of the focusing lens unit at the time of focusing increases. Therefore, when an attempt is made to secure a space which is necessary for the movement of the focusing lens unit, shortening the overall length of the lens system becomes difficult.

Moreover, according to a preferable aspect of the present invention, it is desirable that the focusing lens unit is the only lens unit which moves along the optical axis at the time of focusing from an object at infinity to an object at a close distance, and the rear lens unit has a lens unit having a positive refractive power which is disposed on the image side of the focusing lens unit, immediately after the focusing lens unit, and which includes a positive lens and a negative lens.

By disposing the lens unit having a positive refractive power on the image side of the focusing lens unit, since it is possible to enhance the magnification of the focusing lens unit, the focusing sensitivity is improved. Accordingly, since it is possible to reduce the amount of movement of the focusing lens unit, it is possible to make the focusing speed high. Furthermore, by letting the arrangement of the lens unit having a positive refractive power include the positive lens and the negative lens, it is possible to suppress the longitudinal chromatic aberration and a chromatic aberration of magnification which occur in the lens unit having the positive refractive power.

Moreover, according to a preferable aspect of the present invention, it is desirable that the rear lens unit includes an image-motion correcting lens unit, and the image-motion correcting lens unit moves in a direction different from a direction of the optical axis to reduce an image motion due to shaking of the single focal length lens system.

By shifting a lens unit having a refractive power, it is possible to correct a shift in an imaging position caused due to camera shake. Here, shifting the lens unit means moving the lens unit in the direction different from the direction of the optical axis to reduce an image motion due to shaking of the lens system. It is desirable that the lens unit which is to be shifted is small-sized and light-weight.

In a lens system having a telephoto arrangement, the rear lens unit becomes a lens unit having the smallest lens diameter. Therefore, since the lens system according to the present embodiment adopts the telephoto arrangement, it is preferable to dispose the lens unit to be shifted, or in other words, the image-motion correcting lens unit, in the rear lens unit. By making such an arrangement, since it is possible to make the image-motion correcting lens unit small-sized and light-weight, it is possible to improve a response of the image-motion correction.

Moreover, according to a preferable aspect of the present invention, it is desirable that the rear lens unit includes a second predetermined lens unit which is disposed immediately before the image-motion correcting lens unit, and the second predetermined lens unit has a refractive power having a sign different from a sign of a refractive power of the image-motion correcting lens unit.

By making such an arrangement, it is possible to make the refractive power of the image-motion correcting lens unit large. As a result, it is possible to make an amount of shift in the imaging position large with respect to an amount of shift of the image-motion correcting lens unit. Accordingly, it is possible to carry out image-motion correction of higher accuracy with a small amount of shift.

Moreover, the first predetermined lens unit and the second predetermined lens unit may be the same.

Moreover, according to a preferable aspect of the present invention, it is desirable that the rear lens unit includes a third predetermined lens unit which is disposed immediately after the image-motion correcting lens unit, and the third predetermined lens unit has a refractive power having a sign different from a sign of the refractive power of the image-motion correcting lens unit.

By making such an arrangement, it is possible to make the refractive power of the image-motion correcting lens unit large. As a result, it is possible to make an amount of shift in the imaging position large with respect to an amount of shift of the image-motion correcting lens unit. Accordingly, it is possible to carry out image-motion correction of higher accuracy with a small amount of shift.

Moreover, the first predetermined lens unit and the third predetermined lens unit may be the same.

Moreover, according to a preferable aspect of the present invention, it is desirable that the image-motion correcting lens unit includes a plurality of lenses and a predetermined lens, and the plurality of lenses have a refractive power having a sign same as the sign of the refractive power of the image-motion correcting lens unit, and the predetermined lens has a refractive power having a sign different from the sign of the refractive power of the image-motion correcting lens unit.

Aberrations which occur when there is a shaking are mainly, the spherical aberration, a curvature of field, and a chromatic aberration of magnification. For reducing degradation of correction performance with respect to the shaking, it is necessary to reduce an amount of the aberrations which occur. Here, in the image-motion correcting lens unit, since a proportion of load of the refractive power being large (the refractive power being large), the aberration is susceptible to occur.

Therefore, the image-motion correcting lens unit is formed by the plurality of lenses and the predetermined lens. Moreover, by the plurality of lenses having the refractive power having a sign same as the sign of the refractive power of the image-motion correcting lens unit, it is possible to reduce occurrence of the spherical aberration and the curvature of field. Furthermore, by the predetermined lens having the refractive power having a sign different from the sign of the refractive power of the image-motion correcting lens unit, it is possible to correct the chromatic aberration favorably.

Furthermore, it is desirable to let the number of the plurality of lenses to be two and the number of the predetermined lenses to be one, and to form the image-motion correcting lens unit by a total of three lenses.

Moreover, according to a preferable aspect of the present invention, it is desirable that the rear lens unit includes a second predetermined lens unit which is disposed immediately before the image-motion correcting lens unit, and a third predetermined lens unit which is disposed immediately after the image-motion correcting lens unit, and each of the second predetermined lens unit and the third predetermined lens unit has a refractive power having a sign different from the sign of the refractive power of the image-motion correcting lens unit.

By making such an arrangement, it is possible to make the refractive power of the image-motion correcting lens unit further larger, while suppressing the occurrence of aberration. As a result, it is possible to make the amount of shift in the imaging position further larger with respect to the amount of shift in the image-motion correcting lens unit. Accordingly, it is possible to carry out image-motion correction of higher accuracy with a small amount of shift.

Moreover, according to a preferable aspect of the present invention, it is desirable that the image-motion correcting lens unit has a negative refractive power.

In the image-motion correction, the image-motion correcting lens unit is shifted. For the image-motion correction, it is preferable to make the amount of movement of the image-motion correcting lens unit small (to narrow a range of movement). For making the amount of movement small, it is desirable to let a lens unit (lens) having a smaller lens diameter to be the image-motion correcting lens unit. By letting the refractive power of the image-motion correcting lens unit to be a negative refractive power, it is possible to adopt an optical lay out in which, it is easy to make the lens diameter of the image-motion correcting lens unit small, and therefore it is preferable.

Moreover, according to a preferable aspect of the present invention, it is desirable that the focusing lens unit satisfies the following conditional expression (10):

$$0.9 < |(MG_{foback})^2 \times \{(MG_{fo})^2 - 1\}| < 3.50 \qquad (10)$$

where, $MG_{fo}$ denotes a lateral magnification of the focusing lens unit in an arbitrary focused state, and $MG_{foback}$ denotes a lateral magnification of the overall optical system between the focusing lens unit and the image plane, in an arbitrary focused state.

When falling below a lower limit value of conditional expression (10), since the amount of movement of the focusing lens unit become excessively large, shortening the overall length of the lens system becomes difficult. When exceeding an upper limit value of conditional expression (10), since a position control of the focusing lens unit becomes difficult, it is not possible to carry out an accurate focusing.

Moreover, according to a preferable aspect of the present invention, it is desirable that the single focal length lens system includes an image-motion correcting lens unit which satisfies the following conditional expression (11):

$$2.00 < |MG_{ISback} \times (MG_{IS} \times 1)| < 7.50 \qquad (11)$$

where, $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

When falling below a lower limit value of conditional expression (11), an effect of image-motion correction by shifting the image-motion correcting lens unit is not achieved sufficiently. When exceeding an upper limit value of conditional expression (11), the refractive power of the image-motion correcting lens unit becomes large. Accordingly, correction of the spherical aberration, the astigmatism, and the chromatic aberration of magnification in the image-motion correcting lens unit becomes difficult.

Moreover, according to a preferable aspect of the present invention, it is desirable that the second lens unit includes a negative lens which satisfies the following conditional expression (12):

$$20.0 < v_{G2nMAX} < 65.0 \qquad (12)$$

where, $v_{G2nMAX}$ denotes a maximum Abbe number from among Abbe numbers for the negative lenses in the second lens unit.

When falling below a lower limit value of conditional expression (12), since a dispersion by the negative lens becomes excessively large, correction of a longitudinal chromatic aberration is susceptible to be insufficient. When exceeding an upper limit value of conditional expression (12), since the correction of the longitudinal chromatic aberration tends to be excessive, it becomes difficult to correct the longitudinal chromatic aberration favorably.

Moreover, according to a preferable aspect of the present invention, it is desirable that the third lens unit is a lens unit which is disposed nearest to the image side in the front lens unit.

Accordingly, since the height from the optical axis of a light ray incident on the rear lens unit decreases, it is possible to make small a lens in the rear lens unit including the focusing lens unit.

Moreover, according to a preferable aspect of the present invention, it is desirable that the total number of lenses in the focusing lens unit is not more than two.

In the basic arrangement according to the present embodiment, as aforementioned, it is possible to correct the spherical aberration, the coma, and the astigmatism favorably in the front lens unit. Therefore, by disposing the focusing lens unit in the rear lens unit, it is possible to improve stability of focusing performance. Moreover, with the improvement in the stability of focusing performance, even if the focusing lens unit is formed by a small number of lenses, not more than two, securing improved focusing performance and making the focusing lens unit light-weight are possible.

Moreover, according to a preferable aspect of the present invention, it is desirable that the focusing lens unit consists of two lenses namely, a positive lens and a negative lens.

By the focusing lens unit including the positive lens and the negative lens, it is possible to reduce an occurrence of the longitudinal chromatic aberration and the chromatic aberration of magnification in the focusing lens unit. As a result, it is possible to secure a stable focusing performance at the time of focusing. Moreover, by letting the focusing lens unit to be a two-lens arrangement, it is possible to make the focusing lens unit light-weight while maintaining a superior focusing performance.

Moreover, according to a preferable aspect of the present invention, it is desirable that the focusing lens unit has a negative refractive power, and a lens unit which does not move in the optical axial direction at the time of focusing is a lens unit having a positive refractive power of which, a position is fixed all the time, and the rear lens unit includes a image-motion correcting lens unit and the lens unit having a positive refractive power of which, the position is fixed all the time, and the image-motion correcting lens unit is disposed on the image side of the lens unit having a positive refractive power of which, the position is fixed all the time, and moves in a direction different from a direction of the optical axis to reduce an image motion due to shaking of the single focal length lens system, and the lens unit having a positive refractive power of which, the position is fixed all the time, is disposed on the image side of the image-motion correcting lens unit.

When shortening of the overall length of the lens system is taken into consideration, it is preferable to let a refractive power of a lens unit positioned on the object side of the focusing lens unit to be a positive refractive power, and a refractive power of the focusing lens unit to be a negative refractive power. Since making such an arrangement leads to enhance further the effect due to the telephoto arrangement, such an arrangement is effective in shortening the overall length of the lens system. Moreover, if such an arrangement is made, since it is possible to dispose the focusing lens unit at a position where a light ray is converged gradually, it is possible to make a lens diameter small in the focusing lens unit. As a result of this, it is possible to make the focusing unit small-sized and light-weight.

Moreover, when such an arrangement is made, even if the refractive power of the focusing lens unit is made large, it is possible to make diverging of a light ray small after the light ray has passed through the focusing lens unit. Therefore, it is possible to make a diameter of the overall rear lens unit small while improving the focusing sensitivity. Furthermore, since it is possible to make the diameter of the rear lens unit small and an amount of movement of the focusing lens unit even smaller, it is possible to make the focusing unit further smaller and light-weight.

Moreover, by disposing a lens unit having a positive refractive power on the image side of the focusing lens unit, it is possible to improve the focusing sensitivity easily.

Moreover, in the image-motion correction, the image-motion correcting lens unit is shifted. For the image-motion correction, it is preferable to make the amount of movement of the image-motion correcting lens unit small (to narrow the range of movement). For making the amount of movement small, it is desirable to let a lens unit (lens) having a smaller lens diameter to be the image-motion correcting lens unit. By letting the refractive power of the image-motion correcting lens unit to be a negative refractive power, it is possible to adopt an optical lay out in which, it is easy to make the lens diameter of the image-motion correcting lens unit small, and therefore it is preferable.

Therefore, a lens unit having a positive refractive power is to be disposed on the object side of the image-motion correcting lens unit, and a lens unit having a positive refractive power is to be disposed on the image side of the image-motion correcting lens unit. By making such as arrangement, it is possible to make the refractive power of the image-motion correcting lens unit large. As a result, it is possible to make an amount of shift in the imaging position large with respect to an amount of shift of the image-motion correcting lens unit. Accordingly, it is possible to carryout correction of high accuracy with a small amount of shift. It is desirable that a position of the lens unit having a positive refractive power which is disposed on the object side of the image-motion correcting lens unit and on the image side of the image-motion correcting lens unit is fixed all the time.

Meanwhile, the coma occurs due to shifting of the image-motion correcting lens unit. Therefore, if the focusing lens unit is disposed on the image side of the image-motion correcting lens unit, an effect of correction of the coma fluctuates substantially due to focusing. Therefore, it is not preferable to dispose the focusing lens unit on the image side of the image-motion correcting lens unit.

Moreover, the lens unit having a positive refractive power which is disposed on the object side of the image-motion correcting lens unit is also the positive lens unit disposed on the image side of the focusing lens unit. In such manner, when the lens unit disposed on the object side of the image-motion correcting lens unit and the lens unit disposed on the image side of the focusing lens unit are let to be common, it is possible to make an optical lay out of the rear lens unit simple.

Moreover, by disposing all the lens units in the rear lens unit on the image side of the aperture stop, it is possible to make the diameter of the rear lens unit even smaller.

Moreover, aberrations which occur at the time of focusing are mainly the spherical aberration and the longitudinal chromatic aberration. For reducing degradation of the focusing performance, it is necessary to reduce an amount of occurrence of these aberrations. For this, it is desirable that the focusing lens unit includes at least a positive lens and a negative lens. Furthermore, an aberration occurred in the focusing lens unit is relayed by a lens unit having a positive refractive power which is disposed between the focusing lens unit and the image-motion correcting lens unit. Therefore, it is desirable that the lens unit having a positive refractive power also includes a positive lens and a negative lens.

Moreover, aberrations which occur when there is a shaking are mainly, the spherical aberration, the curvature of field, and the chromatic aberration of magnification. For reducing degradation of correction performance with respect to the shaking, it is necessary to reduce an amount of the aberrations which occur. Here, in the image-motion correcting lens unit, since the proportion of load of the refractive power being large (the refractive power being large), the aberration is susceptible to occur.

Therefore, a plurality of negative lenses is used in the image-motion correcting lens unit, and the negative refractive power of the image-motion correcting lens unit is divided among these negative lenses. By making such an arrangement, it is possible to reduce an occurrence of the spherical aberration and the curvature of field. Furthermore, a positive lens is used in the image-motion correcting lens unit, and with this positive lens and the negative lenses, it is possible to correct the chromatic aberration favorably. Moreover, for correction of these aberrations, it is desirable that the image-motion correcting lens unit includes at least one positive lens and two negative lenses.

Moreover, by forming the focusing lens unit by two lenses, the positive lens unit on the object side in the rear lens unit by not more than two lenses, and the image-motion correcting lens unit by three lenses, it is possible to achieve an arrangement in which, the number of lenses is small, and correction performance at the time of focusing and at the time of correcting image motion is favorable.

Moreover, according to a preferable aspect of the present invention, it is desirable that the single focal length lens system includes in order from an object side, a front lens unit having a positive refractive power, and a rear lens unit, and
    the front lens unit includes in order from the object side,
    a first lens unit having a positive refractive power,
    a second lens unit having a negative refractive power, and
    a third lens unit having a positive refractive power, and
    the first lens unit and the second lens unit include at least a positive lens and a negative lens, and
    the rear lens unit includes in order from the object side,
    a focusing lens unit having a negative refractive power,
    a lens unit having a positive refractive power,
    an image-motion correcting lens unit having a negative refractive power, and
    a lens unit having a positive refractive power.

For shortening the overall length of the lens system, it is necessary to bring an arrangement of the lens system closer to the telephoto arrangement. Therefore, in the front lens unit which has been disposed nearest to the object, the first lens unit having a positive refractive power is disposed, and on the image side thereof, the second lens unit having a negative refractive power is disposed. By making such an arrangement, it becomes possible to correct the spherical aberration, the coma, and the astigmatism mainly, while bringing the arrangement of the lens system closer to the telephoto arrangement.

Moreover, an aperture stop (aperture stop unit) and the rear lens unit are disposed on the image side of the front lens unit having a positive refractive power. Accordingly, it is possible to make a diameter of the rear lens unit small.

Moreover, by carrying out focusing by a lens unit in the rear lens unit, it is possible to form a focusing unit having an extremely small diameter.

Moreover, a lens unit having a refractive power having a sign different from a sign of the refractive power of the focusing lens unit is disposed in the rear lens unit. Accordingly, since it becomes possible to enhance the magnification of the focusing lens unit, an effect of reducing the amount of movement of the focusing lens unit at the time focusing is achieved.

Moreover, in a case of carrying out focusing, zooming, and image-motion correction in the front lens unit, it is necessary to prevent degradation of imaging performance due to focusing, zooming, and image stabilization. For this, it is necessary to make small the occurrence of the spherical aberration, the coma, and the astigmatism in a lens unit which is to be moved. By not disposing the lens unit which is to be moved in the front lens unit, it is possible to reduce a proportion of load of aberration correction in the front lens unit. As a result, in the front lens unit, it is possible to enhance further the effect due to the telephoto arrangement.

Moreover, according to a preferable aspect of the present invention, it is desirable that only the focusing lens unit is a lens unit which is movable in the optical axial direction.

By letting only the focusing lens unit to be a lens unit which is movable in the optical axial direction, it is possible to reduce the number of lenses which are to be moved. Accordingly, it is possible to make a lens unit which is to be moved at the time of focusing light-weight.

Moreover, according to a preferable aspect of the present invention, it is desirable that only the focusing lens unit and the image-motion correcting lens unit are the lens units which are movable.

By letting only the focusing lens unit and the image-motion correcting lens unit to be movable lens units, it is possible to reduce the number of lenses in each of the focusing lens unit and the image-motion correcting lens unit. As a result, it is possible to make each of the focusing lens unit and the image-motion correcting lens unit light-weight.

Moreover, according to a preferable aspect of the present invention, it is desirable that the following conditional expression (13) is satisfied:

$$0 \leq |f/r_{G2b}| < 7.0 \tag{13}$$

where, f denotes the focal length of the single focal length lens system at the time of focusing at an object at infinity, and $r_{G2b}$ denotes a paraxial radius of curvature of a lens surface on the object side of the focusing lens unit, immediately before the focusing lens unit.

When exceeding an upper limit value of conditional expression (13), an amount of occurrence of the spherical aberration and the coma increases at a lens surface immediately before the object side of the focusing lens unit. Since an effect of correction of these aberrations affect the focusing lens unit, it is not possible to secure a stable imaging performance at the time of focusing. Moreover, the lens surface on the object side of the focusing lens unit, immediately before the focusing lens unit, is a lens surface which is positioned on the object side of the focusing lens unit, and is a lens surface which is positioned nearest to the focusing lens unit.

Moreover, according to a preferable aspect of the present invention, it is desirable that the following conditional expression (14) is satisfied:

$$0.5 \leq \phi_{fo}/\phi_{La} \leq 0.92 \tag{14}$$

where, $\phi_{fo}$ denotes a maximum effective aperture from among effective apertures of lenses in the focusing lens unit, and $\phi_{La}$ denotes a maximum effective aperture of a lens positioned nearest to the image in the single focal length lens system.

When exceeding a lower limit value of conditional expression (14), it is possible to suppress the refractive power of the focusing lens unit from becoming large, and to reduce the number of lenses in the focusing lens unit. As a result, it is possible to make the focusing lens unit light-weight. When falling below an upper limit value of conditional expression (14), it is possible to suppress the refractive power of the focusing lens unit from becoming excessively small, and to make the diameter of the focusing lens unit small. Moreover, it is possible to make the amount of movement of the focusing lens unit at the time of focusing small. As a result, it is possible to make the focusing unit small, to shorten the overall length of the optical system, and also to make a diameter of a lens frame small.

Moreover, in a case in which, the focusing lens unit includes a plurality of lenses, $\phi_{fo}$ is a maximum effective aperture from among effective apertures of surfaces of lenses. Moreover, a lens positioned nearest to the image has an object-side surface and an image-side surface. Therefore, $\phi_{La}$ is a maximum effective aperture from among an effective aperture of the object-side surface and an effective aperture of the image-side surface.

Moreover, according to a preferable aspect of the present invention, it is desirable that the following conditional expression (15) is satisfied:

$$0.023 \leq D_{sfo}/D_{LTL} \leq 0.110 \tag{15}$$

where, $D_{sfo}$ denotes a distance on the optical axis from the aperture stop up to a lens surface nearest to an object of the focusing lens unit, $D_{LTL}$ denotes a distance on the optical axis from a lens surface nearest to the object of the single focal length lens system up to an image plane, and both $D_{sfo}$ and $D_{LTL}$ are distances at the time of focusing at an object at infinity.

In the lens system according to the present embodiment, a light beam is converged by using a positive refractive power of a lens unit which is positioned before the aperture stop. When exceeding a lower limit value of conditional expression (15), it is possible to achieve sufficiently an effect of converging the light beam. Therefore, it is possible to suppress the diameter of the focusing lens unit from becoming large. When falling below an upper limit value of conditional expression (15), it is possible to shorten the overall length of the optical system.

Moreover, according to a preferable aspect of the present invention, it is desirable that the following conditional expression (16) is satisfied:

$$0.2 \leq D_{sfo}/\Phi_s \leq 0.8 \tag{16}$$

where, $D_{sfo}$ denotes the distance on the optical axis from the aperture stop up to a lens surface nearest to an object of the focusing lens unit, and is a distance at the time of focusing at an object at infinity, and $\Phi_s$ denotes a maximum diameter of the aperture stop.

In the lens system according to the present embodiment, a light beam is converged by using a positive refractive power of a lens unit which is positioned before the aperture stop. When exceeding a lower limit value of conditional expression (16), it is possible to achieve sufficiently an effect of converging the light beam. Therefore, it is possible to make the diameter of the focusing lens unit small. When falling below an upper limit value of conditional expression (16), it is possible to shorten the overall length of the optical system.

Moreover, according to a preferable aspect of the present invention, it is desirable that an optical system positioned on the image side of the focusing lens unit includes at least two positive lenses and one negative lens.

If the small-sizing of the focusing lens unit is carried out, the refractive power of the focusing lens unit becomes large. Therefore, in the focusing lens unit, the amount of occurrence of the spherical aberration, the longitudinal chromatic aberration, and the astigmatism tends to increase mainly. Here, the optical system positioned on the image side of the focusing lens unit has a positive refractive power. For suppressing a fluctuation in these aberrations at the time of focusing, it is preferable to make the amount of occurrence of these aberrations small in the optical system on the image side of the focusing lens unit.

The optical system positioned on the image side of the focusing lens unit is formed by one positive lens and one negative lens. At this time, by making Abbe number for the negative lens to be smaller than Abbe number for the positive lens, it is possible to suppress the occurrence of the chromatic aberration and the spherical aberration. Moreover, by using one more positive lens, it is possible to suppress the occurrence of the astigmatism easily. Moreover, for making the occurrence of these aberrations even smaller, it is preferable that the optical system positioned on the image side of the focusing lens unit includes at least two positive lenses.

Moreover, an image pickup apparatus according to the present invention includes an optical system, and an image pickup element which has an image pickup surface, and which converts an image formed on the image pickup surface by the optical system to an electric signal, and the optical system is one of the single focal length lens systems according to the aforementioned embodiments.

It is possible to realize an image pickup apparatus which has a superior mobility, and which is capable of carrying out photography with high resolution.

It is preferable that a plurality of abovementioned arrangements is satisfied simultaneously.

Moreover, by restricting either both or one of the upper limit value and the lower limit value in each conditional expression, it is possible to have that function assuredly, and therefore it is preferable.

For conditional expression (1), it is more preferable to let the lower limit value to be 0.25, and 0.30 is even more preferable.

Moreover, for conditional expression (1), it is more preferable to let the upper limit value to be 0.70, and 0.60 is even more preferable.

For conditional expression (2), it is more preferable to let the lower limit value to be 0.40, and 0.50 is even more preferable.

Moreover, for conditional expression (2), it is more preferable to let the upper limit value to be 1.75, and 1.50 is even more preferable.

For conditional expression (3), it is more preferable to let the lower limit value to be −2.00, and −1.50 is even more preferable.

Moreover, for conditional expression (3), it is more preferable to let the upper limit value to be −0.20, and −0.30 is even more preferable.

For conditional expression (5), it is more preferable to let the lower limit value to be 0.30, and 0.40 is even more preferable.

Moreover, for conditional expression (5), it is more preferable to let the upper limit value to be 1.60, and 1.20 is even more preferable.

For conditional expression (6), it is more preferable to let the lower limit value to be 0.08, and 0.10 is even more preferable.

Moreover, for conditional expression (6), it is more preferable to let the upper limit value to be 0.30, and 0.25 is even more preferable.

For conditional expression (7), it is more preferable to let the lower limit value to be 1.80, and 2.00 is even more preferable.

Moreover, for conditional expression (7), it is more preferable to let the upper limit value to be 9.00, and 8.00 is even more preferable.

For conditional expression (8), it is more preferable to let the lower limit value to be 80.5, and 81.0 is even more preferable.

Moreover, for conditional expression (8), it is more preferable to let the upper limit value to be 97, and 96 is even more preferable.

For conditional expression (9), it is more preferable to let the lower limit value to be 0.10, and 0.15 is even more preferable.

Moreover, for conditional expression (9), it is more preferable to let the upper limit value to be 0.80, and 0.60 is even more preferable.

For conditional expression (10), it is more preferable to let the lower limit value to be 1.10, and 1.30 is even more preferable.

Moreover, for conditional expression (10), it is more preferable to let the upper limit value to be 3.00, and 2.50 is even more preferable.

For conditional expression (11), it is more preferable to let the lower limit value to be 2.50, and 3.00 is even more preferable.

Moreover, for conditional expression (11), it is more preferable to let the upper limit value to be 7.00, and 6.50 is even more preferable.

For conditional expression (12), it is more preferable to let the lower limit value to be 30.0, and 40.0 is even more preferable.

Moreover, for conditional expression (12), it is more preferable to let the upper limit value to be 60.0, and 55.0 is even more preferable.

For conditional expression (13), it is more preferable to let the upper limit value to be 6.5. It is even more preferable to let the upper limit value to be 4.0, and 2.0 is all the more preferable.

For conditional expression (14), it is more preferable to let the lower limit value to be 0.6.

Moreover, for conditional expression (14), it is more preferable to let the upper limit value to be 0.88, and 0.85 is even more preferable.

For conditional expression (15), it is more preferable to let the lower limit value to be 0.025, and 0.04 is even more preferable.

Moreover, for conditional expression (15), it is more preferable to let the upper limit value to be 0.1, and 0.090 is even more preferable.

For conditional expression (16), it is more preferable to let the lower limit value to be 0.3, and 0.45 is even more preferable.

Moreover, for conditional expression (16), it is more preferable to let the upper limit value to be 0.75, and 0.7 is even more preferable.

Moreover, the aforementioned single focal length lens system and the image pickup apparatus may satisfy the plurality of arrangements simultaneously. Making such an arrangement is preferable for achieving a favorable single focal length lens system and an image pickup apparatus. Moreover, combinations of preferable arrangements are arbitrary. Moreover, for each conditional expression, only an upper limit value or a lower limit value of a numerical range of a conditional expression further restricted may be restricted.

Examples of the single focal length lens system according to the present invention will be described below in detail by referring to the accompanying diagrams. However, the present invention is not restricted to the examples described below.

Examples from an example 1 to an example 5 of the single focal length lens system will be described below. Lens cross-sectional views at the time of focusing at an object at infinity of the examples from the example 1 to the example 5 are shown in FIG. 1A, FIG. 1B, FIG. 2A, FIG. 2B, and FIG. 3.

In the lens cross-sectional views, a first lens unit is denotes by G1, a second lens unit is denoted by G2, an aperture stop is denoted by S, a third lens unit is denoted by G3, a fourth lens unit is denoted by G4, a fifth lens unit is denoted by G5, a sixth lens unit is denoted by G6, a seventh lens unit is denoted by G7, an eighth lens unit is denoted by G8, and an image plane is denoted by I. Although it is not shown in the diagrams, a parallel flat plate which forms a low-pass filter, and a cover glass of an electronic image pickup element, may be disposed between a last lens unit and the image plane I. A wavelength region restricting coating which restricts infrared light may be applied to a surface of the parallel flat plate. Moreover, a multilayer film for restricting a wavelength region may be formed on a surface of the cover glass. Furthermore, the cover glass may be imparted a low-pass filter effect. An image pickup element is disposed on the image plane I.

Correspondence between the lens units in the aforementioned description of the embodiments and the lens units in the description of the examples below is as follows.
(1) The second lens unit in the aforementioned description of the embodiments corresponds to a third lens unit G3 in the examples from the example 1 to the example 5.
(2) The third lens unit in the aforementioned description of the embodiments corresponds to a fourth lens unit G4 in the examples from the example 1 to the example 5.
(3) The focusing lens unit in the aforementioned description of the embodiments corresponds to a fifth lens unit G5 in the examples from the example 1 to the example 5.
(4) The image-motion correcting lens unit in the aforementioned description of the embodiments corresponds to a seventh lens unit G7 in the examples from the example 1 to the example 4, and to a sixth lens unit G6 in the example 5.

A single focal length lens system according to the example 1, as shown in FIG. 1A, includes in order from an object side, a first lens unit G1 having a positive refractive power, a second lens unit G2 having a positive refractive power, a third lens unit G3 having a negative refractive power, an aperture stop S, a fourth lens unit G4 having a positive refractive power, a fifth lens unit G5 having a negative refractive power, a sixth lens unit G6 having a positive refractive power, a seventh lens unit G7 having a negative refractive power, and an eighth lens unit G8 having a positive refractive power.

A front lens unit $G_f$ having a positive refractive power includes the first lens unit G1, the second lens unit G2, the third lens unit G3, and the fourth lens unit G4.

A rear lens unit $G_R$ includes the fifth lens unit G5, the sixth lens unit G6, the seventh lens unit G7, and the eighth lens unit G8.

The first lens unit G1 includes a biconvex positive lens L1, a positive meniscus lens L2 having a convex surface directed toward the object side, and a negative meniscus lens L3 having a convex surface directed toward the object side. The positive meniscus lens L2 and the negative meniscus lens L3 are cemented.

The second lens unit G2 includes a negative meniscus lens L4 having a convex surface directed toward the object side and a positive meniscus lens L5 having a convex surface directed toward the object side. The negative meniscus lens L4 and the positive meniscus lens L5 are cemented.

The third lens unit G3 includes a biconvex positive lens L6 and a biconcave negative lens L7. The biconvex positive lens L6 and the biconcave negative lens L7 are cemented.

The fourth lens unit G4 includes a biconvex positive lens L8.

The fifth lens unit G5 includes a biconvex positive lens L9 and a biconcave negative lens L10. The fifth lens unit G5 is the focusing lens unit, and moves toward an image side along an optical axis at the time of focusing from an object at infinity to an object at a close distance.

The sixth lens unit G6 includes a negative meniscus lens L11 having a convex surface directed toward the object side and a positive meniscus lens L12 having a convex surface directed toward the object side. The negative meniscus lens L11 and the positive meniscus lens L12 are cemented.

The seventh lens unit G7 includes a biconvex positive lens L13, a biconcave negative lens L14, and a biconcave negative lens L15. The seventh lens unit G7 is the image-motion correcting lens unit, and moves in a direction different from an optical axial direction, such as a direction orthogonal to the optical axis at the time of correcting image motion.

The eighth lens unit G8 includes a biconvex positive lens L16, a biconvex positive lens L17, and a negative meniscus lens L18 having a convex surface directed toward the image side.

Figure 1B:
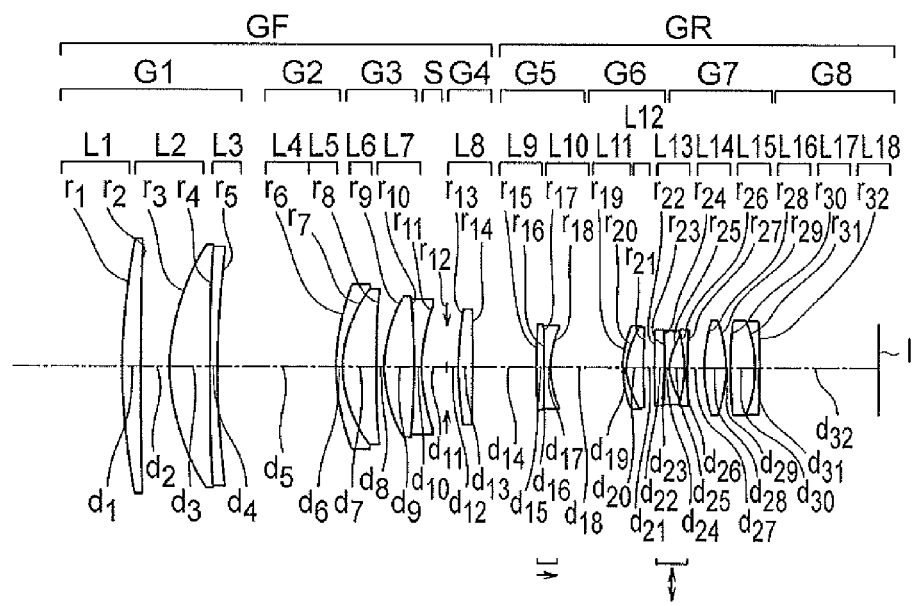

A single focal length lens system according to the example 2, as shown in FIG. 1B, includes in order from an object side, a first lens unit G1 having a positive refractive power, a second lens unit G2 having a positive refractive power, a third lens unit G3 having a negative refractive power, an aperture stop S, a fourth lens unit G4 having a positive refractive power, a fifth lens unit G5 having a negative refractive power, a sixth lens unit G6 having a positive refractive power, a seventh lens unit G7 having a negative refractive power, and an eighth lens unit G8 having a positive refractive power.

A front lens unit $G_f$ having a positive refractive power includes the first lens unit G1, the second lens unit G2, the third lens unit G3, the aperture stop S, and the fourth lens unit G4.

A rear lens unit $G_R$ includes the fifth lens unit G5, the sixth lens unit G6, the seventh lens unit G7, and the eighth lens unit G8.

The first lens unit G1 includes a positive meniscus lens L1 having a convex surface directed toward the object side, a positive meniscus lens L2 having a convex surface directed toward the object side, and a negative meniscus lens L3 having a convex surface directed toward the object side. The positive meniscus lens L2 and the negative meniscus lens L3 are cemented.

The second lens unit G2 includes a negative meniscus lens L4 having a convex surface directed toward the object side and a positive meniscus lens L5 having a convex surface directed toward the object side. The negative meniscus lens L4 and the positive meniscus lens L5 are cemented.

The third lens unit G3 includes a biconvex positive lens L6 and a biconcave negative lens L7. The biconvex positive lens L6 and the biconcave negative lens L7 are cemented.

The fourth lens unit G4 includes a positive meniscus lens L8 having a convex surface directed toward the object side.

The fifth lens unit G5 includes a biconvex positive lens L9 and a biconcave negative lens L10. The fifth lens unit G5 is the focusing lens unit, and moves toward an image side along an optical axis at the time of focusing from an object at infinity to an object at a close distance.

The sixth lens unit G6 includes a negative meniscus lens L11 having a convex surface directed toward the object side and a biconvex positive lens L12. The negative meniscus lens L11 and the biconvex positive lens L12 are cemented.

The seventh lens unit G7 includes a biconvex positive lens L13, a biconcave negative lens L14, and a biconcave negative lens L15. The seventh lens unit G7 is the image-motion correcting lens unit, and moves in a direction different from an optical axial direction, such as a direction orthogonal to the optical axis, at the time of correcting image motion.

The eighth lens unit G8 includes a biconvex positive lens L16, a biconvex positive lens L17, and a negative meniscus lens L18 having a convex surface directed toward the image side. The biconvex positive lens L17 and the negative meniscus lens L18 are cemented.

Figure 2A:
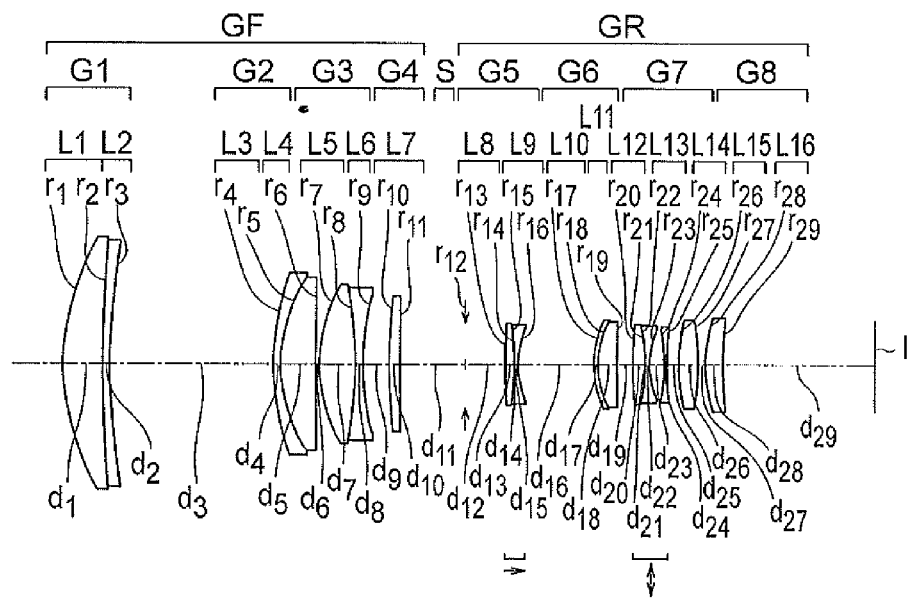
FIG. 2A and FIG. 2B are lens cross-sectional views at the time of focusing at an object at infinity of a single focal length lens systems according to the present invention, where.

A single focal length lens system according to the example 3, as shown in FIG. 2A, includes in order from an object side, a first lens unit G1 having a positive refractive power, a second lens unit G2 having a positive refractive power, a third lens unit G3 having a negative refractive power, an aperture stop S, a fourth lens unit G4 having a positive refractive power, a fifth lens unit G5 having a negative refractive power, a sixth lens unit G6 having a positive refractive power, a seventh lens unit G7 having a negative refractive power, and an eighth lens unit G8 having a positive refractive power.

A front lens unit $G_f$ having a positive refractive power includes the first lens unit G1, the second lens unit G2, the third lens unit G3, and the fourth lens unit G4.

The rear lens unit $G_R$ includes the fifth lens unit G5, the sixth lens unit G6, the seventh lens unit G7, and the eighth lens unit G8.

The first lens unit G1 includes a positive meniscus lens L1 having a convex surface directed toward the object side and a negative meniscus lens L2 having a convex surface directed toward the object side. The positive meniscus lens L1 and the negative meniscus lens L2 are cemented.

The second lens unit G2 includes a negative meniscus lens L3 having a convex surface directed toward the object side and a biconvex positive lens L4. The negative meniscus lens L3 and the biconvex positive lens L4 are cemented.

The third lens unit G3 includes a biconvex positive lens L5 and a biconcave negative lens L6. The biconvex positive lens L5 and the biconcave negative lens L6 are cemented.

The fourth lens unit G4 includes a positive meniscus lens L7 having a convex surface directed toward the object side.

The fifth lens unit G5 includes a biconvex positive lens L8 and a biconcave negative lens L9. The fifth lens unit G5 is the focusing lens unit, and moves toward an image side along an optical axis, at the time of focusing from an object at infinity to an object at a close distance.

The sixth lens unit G6 includes a negative meniscus lens L10 having a convex surface directed toward the object side and a biconvex positive lens L11. The negative meniscus lens L10 and the biconvex positive lens L11 are cemented.

The seventh lens unit G7 includes a biconvex positive lens L12, a biconcave negative lens L13, and a biconcave negative lens L14. The seventh lens unit G7 is the image-motion correcting lens unit, and moves in a direction different from an optical axial direction, such as a direction orthogonal to the optical axis, at the time of correcting image motion.

The eighth lens unit G8 includes a biconvex positive lens L15 and a positive meniscus lens L16 having a convex surface directed toward the object side.

Figure 2B:
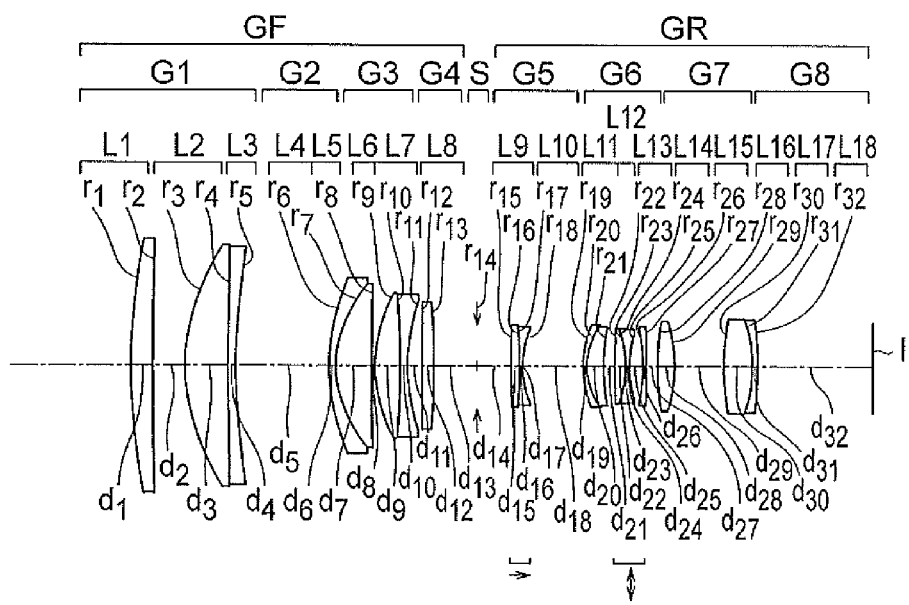

A single focal length lens system according to the example 4, as shown in FIG. 2B, includes in order from an object side, a first lens unit G1 having a positive refractive power, a second lens unit G2 having a positive refractive power, a third lens unit G3 having a negative refractive power, a fourth lens unit G4 having a positive refractive power, an aperture stop S, a fifth lens unit G5 having a negative refractive power, a sixth lens unit G6 having a positive refractive power, a seventh lens unit G7 having a negative refractive power, and an eighth lens unit G8 having a positive refractive power.

A front lens unit $G_f$ having a positive refractive power includes the first lens unit G1, the second lens unit G2, the third lens unit G3, and the fourth lens unit G4.

A rear lens unit $G_R$ includes the fifth lens unit G5, the sixth lens unit G6, the seventh lens unit G7, and the eighth lens unit G8.

The first lens unit G1 includes a positive meniscus lens L1 having a convex surface directed toward the object side, a positive meniscus lens L2 having a convex surface directed toward the object side, and a negative meniscus lens L3 having a convex surface directed toward the object side. The positive meniscus lens L2 and the negative meniscus lens L3 are cemented.

The second lens unit G2 includes a negative meniscus lens L4 having a convex surface directed toward the object side and a positive meniscus lens L5 having a convex surface directed toward the object side. The negative meniscus lens L4 and the positive meniscus lens L5 are cemented.

The third lens unit G3 includes a biconvex positive lens L6 and a biconcave negative lens L7. The biconvex positive lens L6 and the biconcave negative lens L7 are cemented.

The fourth lens unit G4 includes a biconvex positive lens L8.

The fifth lens unit G5 includes a biconvex positive lens L9 and a biconcave negative lens L10. The fifth lens unit G5 is the focusing lens unit, and moves toward an image side along an optical axis, at the time of focusing from an object at infinity to an object at a close distance.

The sixth lens unit G6 includes a negative meniscus lens L11 having a convex surface directed toward the object side and a positive meniscus lens L12 having a convex surface directed toward the object side. The negative meniscus lens L11 and the positive meniscus lens L12 are cemented.

The seventh lens unit G7 includes a biconvex positive lens L13, a biconcave negative lens L14, and a negative meniscus lens L15 having a convex surface directed toward the image side.

The eighth lens unit G8 includes a biconvex positive lens L16, a biconvex positive lens L17, and a negative meniscus lens L18 having a convex surface directed toward the image side. The biconvex positive lens L17 and the negative meniscus lens L18 are cemented.

Figure 3:
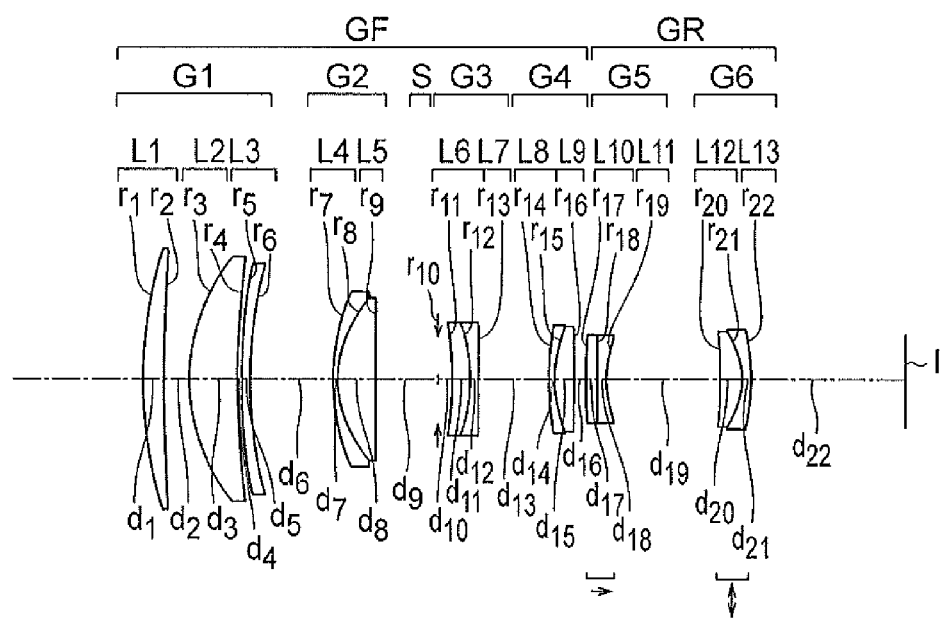
FIG. 3 is a lens cross-sectional view at the time of focusing at an object at infinity of a single focal length lens system according to the present invention, and is a lens cross-sectional view of a single focal length lens system according to an example 5.
Figures 4A, 4B, 4C, 4D:
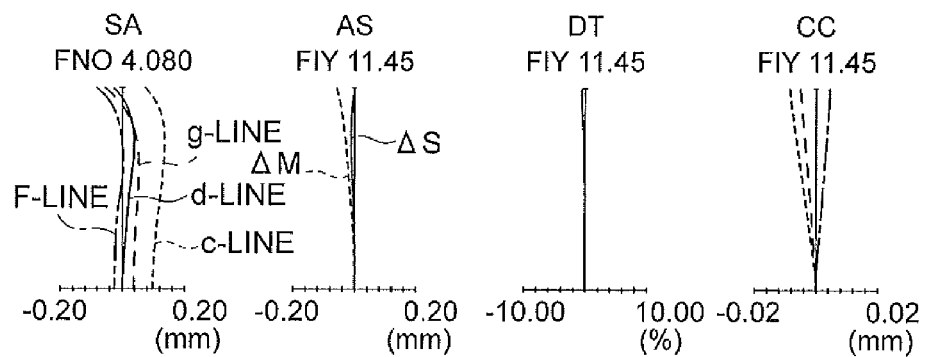
FIG. 4A, FIG. 4B, FIG. 4C, and FIG. 4D are aberration diagrams at the time of focusing at an object at infinity of the single focal length lens system according to the example 1.
Figures 4E, 4F, 4G, 4H:
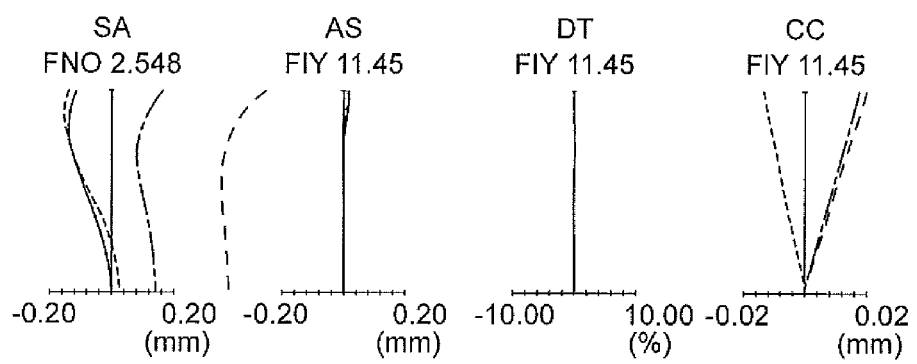
FIG. 4E, FIG. 4F, FIG. 4G, and FIG. 4H are aberration diagrams at the time of focusing at an object at a close distance of the single focal length lens system according to the example 1.

A single focal length lens system according to the example 5, as shown in FIG. 3, includes in order from an object side, a first lens unit G1 having a positive refractive power, a second lens unit G2 having a positive refractive power, an aperture stop S, a third lens unit G3 having a negative refractive power, a fourth lens unit G4 having a positive refractive power, a fifth lens unit G5 having a negative refractive power, and a sixth lens unit G6 having a positive refractive power.

A front lens unit $G_f$ having a positive refractive power includes the first lens unit G1, the second lens unit G2, the aperture stop S, the third lens unit G3, and the fourth lens unit G4.

A rear lens unit $G_R$ includes the fifth lens unit G5 and the sixth lens unit G6.

The first lens unit G1 includes a positive meniscus lens L1 having a convex surface directed toward the object side, a positive meniscus lens L2 having a convex surface directed toward the object side, and a negative meniscus lens L3 having a convex surface directed toward the object side.

The second lens unit G2 includes a negative meniscus lens L4 having a convex surface directed toward the object side and a positive meniscus lens L5 having a convex surface directed toward the object side. The negative meniscus lens L4 and the positive meniscus lens L5 are cemented.

The third lens unit G3 includes a positive meniscus lens L6 having a convex surface directed toward an image side and a negative meniscus lens L7 having a convex surface directed toward the image side. The positive meniscus lens L6 and the negative meniscus lens L7 are cemented.

The fourth lens unit G4 includes a negative meniscus lens L8 having a convex surface directed toward the object side and a biconvex positive lens L9. The negative meniscus lens L8 and the biconvex positive lens L9 are cemented.

The fifth lens unit G5 includes a positive meniscus lens L10 having a convex surface directed toward the object side and a negative meniscus lens L11 having a convex surface directed toward the object side. The positive meniscus lens L10 and the negative meniscus lens L11 are cemented. The fifth lens unit G5 is the focusing lens unit, and moves toward the image side along an optical axis, at the time of focusing from an object at infinity to an object at a close distance.

The sixth lens unit G6 includes a positive meniscus lens L12 having a convex surface directed toward the image side and a negative meniscus lens L13 having a convex surface directed toward the image side. The positive meniscus lens L11 and the negative meniscus lens L12 are cemented. The sixth lens unit is the image-motion correcting lens unit, and moves in a direction different from an optical axial direction, such as a direction orthogonal to the optical axis, at the time of correcting image motion.

Numerical data of each example is shown below. Apart from the aforementioned symbols, r denotes a radius of curvature of a lens surface, d denotes a distance between lens surfaces, nd denotes a refractive index for a d-line of each lens, and vd denotes Abbe number for each lens. Moreover f denotes a focal length of the overall single focal length lens system, FNO. denotes an F-number, ω denotes a half angle of view, IH denotes an image height, FB denotes a back focus, and Lens total length is a distance from a lens surface nearest to the object of the single focal length lens system up to a lens surface nearest to the image of the single focal length lens system. FB (back focus) is a value which is a distance from the last lens surface up to a paraxial image plane expressed upon air conversion. Moreover, the unit of length for each numerical value is mm, and the unit of angle is ° (degree).

Moreover, Infinity indicates the time of focusing at an object at infinity and Close distance indicates the time of focusing at an object at a close distance. Here, values in a column of close distance are values in a state of being focused at an object at a closest distance. A practical distance between an object and an image in the state of being focused at an object at a closest distance is 1.4 m in the examples 1, 2, 3, 4, and 5.

Example 1

| Unit mm | | | | |
|---|---|---|---|---|
| Surface data | | | | |
| Surface no. | r | d | nd | vd |
| 1 | 241.758 | 5.300 | 1.48749 | 70.23 |
| 2 | −3746.870 | 25.034 | | |
| 3 | 65.000 | 11.000 | 1.48749 | 70.23 |
| 4 | 529.987 | 2.000 | 1.77250 | 49.60 |
| 5 | 213.282 | 31.856 | | |
| 6 | 68.733 | 2.000 | 1.80440 | 39.59 |
| 7 | 38.014 | 9.200 | 1.43875 | 94.93 |
| 8 | 307.127 | 1.000 | | |
| 9 | 43.349 | 8.500 | 1.43875 | 94.93 |
| 10 | −147.947 | 2.000 | 1.77250 | 49.60 |
| 11 | 56.680 | 10.800 | | |
| 12 | 409.022 | 3.300 | 1.80000 | 29.84 |
| 13 | −220.992 | 10.500 | | |
| 14 (Stop) | ∞ | Variable | | |
| 15 | 396.841 | 2.600 | 1.83400 | 37.16 |
| 16 | −49.446 | 0.100 | | |
| 17 | −49.446 | 0.900 | 1.75500 | 52.32 |
| 18 | 29.894 | Variable | | |
| 19 | 24.865 | 1.000 | 1.84666 | 23.78 |
| 20 | 20.648 | 4.900 | 1.53996 | 59.46 |
| 21 | 137.167 | 3.000 | | |
| 22 | 68.026 | 3.300 | 1.84666 | 23.78 |
| 23 | −55.162 | 0.100 | | |
| 24 | −55.162 | 0.900 | 1.77250 | 49.60 |
| 25 | 21.512 | 3.593 | | |
| 26 | −45.346 | 0.800 | 1.72916 | 54.68 |
| 27 | 87.853 | 3.300 | | |
| 28 | 40.342 | 5.500 | 1.63980 | 34.46 |
| 29 | −67.272 | 2.048 | | |
| 30 | 43.416 | 7.000 | 1.53172 | 48.84 |
| 31 | −27.576 | 1.500 | 1.84666 | 23.78 |
| 32 | −220.717 | | | |
| Image plane | ∞ | | | |

| Various data | | |
|---|---|---|
| | Infinity | Close distance |
| F | 293.993 | 185.359 |
| FNO. | 4.080 | 2.548 |
| 2ω (Angle of view) | 4.4 | |
| IH | 11.45 | 11.45 |
| FB | 35.346 | 35.346 |
| Lens total length | 226.972 | 226.972 |
| d14 | 7.808 | 24.895 |
| d18 | 20.787 | 3.700 |

Example 2

Unit mm

Surface data

| Surface no. | r | d | nd | νd |
|---|---|---|---|---|
| 1 | 191.955 | 5.200 | 1.48749 | 70.23 |
| 2 | 917.171 | 8.000 | | |
| 3 | 65.708 | 11.200 | 1.48749 | 70.23 |
| 4 | 645.369 | 2.000 | 1.76200 | 40.10 |
| 5 | 233.489 | 33.376 | | |
| 6 | 68.978 | 2.000 | 1.80440 | 39.59 |
| 7 | 37.317 | 9.400 | 1.43875 | 94.93 |
| 8 | 242.015 | 2.323 | | |
| 9 | 40.400 | 8.600 | 1.43875 | 94.93 |
| 10 | −185.461 | 2.000 | 1.77250 | 49.60 |
| 11 | 49.376 | 7.291 | | |
| 12 (Stop) | ∞ | 3.000 | | |
| 13 | 98.106 | 4.000 | 1.80810 | 22.76 |
| 14 | 1031.019 | Variable | | |
| 15 | 154.804 | 2.600 | 1.80518 | 25.42 |
| 16 | −139.360 | 0.100 | | |
| 17 | −139.360 | 1.500 | 1.75500 | 52.32 |
| 18 | 28.243 | Variable | | |
| 19 | 30.165 | 1.000 | 1.84666 | 23.78 |
| 20 | 18.508 | 4.900 | 1.53996 | 59.46 |
| 21 | −121.485 | 3.000 | | |
| 22 | 198.480 | 3.000 | 1.84666 | 23.78 |
| 23 | −185.101 | 0.100 | | |
| 24 | −185.101 | 0.900 | 1.77250 | 49.60 |
| 25 | 24.785 | 4.700 | | |
| 26 | −35.230 | 0.800 | 1.72916 | 54.68 |
| 27 | 527.966 | 4.702 | | |
| 28 | 51.272 | 6.200 | 1.63980 | 34.46 |
| 29 | −38.027 | 1.000 | | |
| 30 | 123.480 | 7.000 | 1.53172 | 48.84 |
| 31 | −38.505 | 1.500 | 1.85026 | 32.27 |
| 32 | −171.204 | | | |
| Image plane | ∞ | | | |

Various data

| | Infinity | Close distance |
|---|---|---|
| f | 293.996 | 199.465 |
| FNO. | 4.103 | 2.758 |
| 2ω (Angle of view) | 4.4 | |
| IH | 11.45 | 11.45 |
| FB | 33.409 | 33.409 |
| Lens total length | 212.448 | 212.448 |
| d14 | 17.758 | 33.947 |
| d18 | 19.889 | 3.700 |

Example 3

Unit mm

Surface data

| Surface no. | r | d | nd | νd |
|---|---|---|---|---|
| 1 | 76.359 | 11.000 | 1.56384 | 60.67 |
| 2 | 496.674 | 2.000 | 1.80400 | 46.57 |
| 3 | 230.397 | 45.646 | | |
| 4 | 80.537 | 2.000 | 1.80440 | 39.59 |
| 5 | 46.639 | 10.000 | 1.43875 | 94.93 |
| 6 | −6216.208 | 1.000 | | |
| 7 | 48.292 | 10.200 | 1.43875 | 94.93 |
| 8 | −125.888 | 2.000 | 1.77250 | 49.60 |
| 9 | 77.753 | 7.280 | | |
| 10 | 124.265 | 3.300 | 1.80518 | 25.42 |
| 11 | 381.882 | 18.441 | | |
| 12 (Stop) | ∞ | Variable | | |
| 13 | 416.644 | 2.600 | 1.83400 | 37.16 |
| 14 | −108.782 | 0.100 | | |
| 15 | −108.782 | 0.900 | 1.75500 | 52.32 |
| 16 | 32.799 | Variable | | |
| 17 | 34.015 | 1.000 | 1.84666 | 23.78 |
| 18 | 26.729 | 5.500 | 1.48749 | 70.23 |
| 19 | −122.308 | 4.300 | | |
| 20 | 127.546 | 3.600 | 1.84666 | 23.78 |
| 21 | −41.985 | 0.100 | | |
| 22 | −41.985 | 0.900 | 1.77250 | 49.60 |
| 23 | 24.300 | 4.242 | | |
| 24 | −56.817 | 0.800 | 1.76200 | 40.10 |
| 25 | 133.001 | 3.300 | | |
| 26 | 64.750 | 5.500 | 1.59522 | 67.74 |
| 27 | −68.082 | 1.780 | | |
| 28 | 40.392 | 5.000 | 1.64000 | 60.08 |
| 29 | 118.421 | | | |
| Image plane | ∞ | | | |

Various data

| | Infinity | Close distance |
|---|---|---|
| f | 293.995 | 204.013 |
| FNO. | 4.087 | 2.822 |
| 2ω (Angle of view) | 4.4 | |
| IH | 11.45 | 11.45 |
| FB | 43.200 | 43.200 |
| Lens total length | 228.580 | 228.580 |
| d12 | 11.453 | 29.179 |
| d16 | 21.439 | 3.713 |

Example 4

Unit mm

Surface data

| Surface no. | r | d | nd | νd |
|---|---|---|---|---|
| 1 | 200.204 | 6.500 | 1.48749 | 70.23 |
| 2 | 9652.008 | 8.700 | | |
| 3 | 63.000 | 12.000 | 1.48749 | 70.23 |
| 4 | 3218.044 | 2.000 | 1.77250 | 49.60 |
| 5 | 235.889 | 26.200 | | |
| 6 | 61.098 | 2.000 | 1.80440 | 39.59 |
| 7 | 35.228 | 10.000 | 1.43875 | 94.93 |
| 8 | 627.672 | 1.150 | | |
| 9 | 43.917 | 7.300 | 1.43875 | 94.93 |
| 10 | −180.158 | 2.000 | 1.75500 | 52.32 |
| 11 | 54.327 | 4.100 | | |
| 12 | 1178.201 | 3.500 | 1.84666 | 23.78 |
| 13 | −236.625 | 12.200 | | |
| 14 (Stop) | ∞ | Variable | | |
| 15 | 373.021 | 2.200 | 1.84666 | 23.78 |
| 16 | −431.226 | 0.100 | | |
| 17 | −431.226 | 0.900 | 1.75500 | 52.32 |
| 18 | 28.506 | Variable | | |
| 19 | 26.482 | 1.000 | 1.92286 | 18.90 |
| 20 | 20.008 | 4.900 | 1.57135 | 52.95 |
| 21 | 49.324 | 3.000 | | |
| 22 | 550.613 | 3.300 | 1.84666 | 23.78 |
| 23 | −28.366 | 0.100 | | |
| 24 | −28.366 | 0.900 | 1.77250 | 49.60 |
| 25 | 35.172 | 3.848 | | |
| 26 | −44.584 | 0.800 | 1.72916 | 54.68 |
| 27 | −505.483 | 3.300 | | |
| 28 | 92.990 | 5.000 | 1.63980 | 34.46 |
| 29 | −41.237 | 13.530 | | |

-continued

Unit mm

| | | | | |
|---|---|---|---|---|
| 30 | 80.683 | 8.100 | 1.53172 | 48.84 |
| 31 | −41.265 | 1.500 | 1.92286 | 18.90 |
| 32 | −101.115 | | | |
| Image plane | ∞ | | | |

Various data

| | Infinity | Close distance |
|---|---|---|
| f | 293.997 | 213.531 |
| FNO. | 4.080 | 2.946 |
| 2ω (Angle of view) | 4.3 | |
| IH | 11.45 | 11.45 |
| FB | 32.899 | 32.899 |
| Lens total length | 209.386 | 209.386 |
| d14 | 9.501 | 22.659 |
| d18 | 16.859 | 3.700 |

Example 5

Unit mm

Surface data

| Surface no. | r | d | nd | vd |
|---|---|---|---|---|
| 1 | 129.538 | 6.000 | 1.48749 | 70.23 |
| 2 | 817.240 | 6.518 | | |
| 3 | 57.205 | 13.000 | 1.49700 | 81.54 |
| 4 | 257.405 | 1.283 | | |
| 5 | 221.569 | 2.000 | 1.88300 | 40.76 |
| 6 | 121.524 | 22.702 | | |
| 7 | 65.565 | 1.310 | 1.77250 | 49.60 |
| 8 | 34.985 | 10.500 | 1.43875 | 94.93 |
| 9 | 4028.723 | 16.955 | | |
| 10 (Stop) | ∞ | 4.000 | | |
| 11 | −95.863 | 4.900 | 1.74077 | 27.79 |
| 12 | −46.063 | 2.200 | 1.88300 | 40.76 |
| 13 | −474.622 | 19.286 | | |
| 14 | 85.349 | 1.500 | 1.67790 | 50.72 |
| 15 | 39.644 | 5.500 | 1.51633 | 64.14 |
| 16 | −367.055 | Variable | | |
| 17 | 194.797 | 2.979 | 1.80518 | 25.42 |
| 18 | 3169.526 | 2.500 | 1.72916 | 54.68 |
| 19 | 31.180 | Variable | | |
| 20 | −136.382 | 6.000 | 1.84666 | 23.78 |
| 21 | −23.343 | 2.500 | 1.80810 | 22.76 |
| 22 | −67.243 | | | |
| Image plane | ∞ | | | |

Various data

| | Infinity | Close distance |
|---|---|---|
| f | 294.001 | 181.797 |
| FNO. | 4.080 | 2.518 |
| 2ω (Angle of view) | 4.3 | |
| IH | 11.45 | 11.45 |
| FB | 42.469 | 42.469 |
| Lens total length | 208.065 | 208.065 |
| d16 | 3.000 | 29.119 |
| d19 | 30.963 | 4.843 |

Aberration diagrams of examples from the example 1 to the example 5 are shown in FIG. 4A, FIG. 4B, FIG. 4C, FIG. 4D, FIG. 4E, FIG. 4F, FIG. 4G, and FIG. 4H to FIG. 8A, FIG. 8B, FIG. 8C, FIG. 8D, FIG. 8E, FIG. 8F, FIG. 8G, and FIG. 8H. In each diagram, FIY denotes the maximum image height.

In these aberration diagrams, FIG. 4A, FIG. 5A, FIG. 6A, FIG. 7A, and FIG. 8A show a spherical aberration (SA) at the time of focusing at an object at infinity, FIG. 4B, FIG. 5B, FIG. 6B, FIG. 7B, and FIG. 8B show an astigmatism (AS) at the time of focusing at an object at infinity, FIG. 4C, FIG. 5C, FIG. 6C, FIG. 7C, and FIG. 8C show a distortion (DT) at the time of focusing at an object at infinity, and FIG. 4D, FIG. 5D, FIG. 6D, FIG. 7D, and FIG. 8D show a chromatic aberration of magnification (CC) at the time of focusing at an object at infinity.

Moreover, FIG. 4E, FIG. 5E, FIG. 6E, FIG. 7E, and FIG. 8E show a spherical aberration (SA) at the time of focusing at an object at a close distance, FIG. 4F, FIG. 5F, FIG. 6F, FIG. 7F, and FIG. 8F show an astigmatism (AS) at the time of focusing at an object at a close distance, FIG. 4G, FIG. 5G, FIG. 6G, FIG. 7G, and FIG. 8G show a distortion (DT) at the time of focusing at the time of focusing at an object at a close distance, and FIG. 4H, FIG. 5H, FIG. 6H, FIG. 7H, and FIG. 8H show a chromatic aberration of magnification (CC) at the time of focusing at an object at a close distance.

Next, values of conditional expressions (1) to (13) in each example are given below.

| Conditional expressions | Example 1 | Example 2 | Example 3 |
|---|---|---|---|
| (1) $f_{FF}/f$ | 0.44 | 0.42 | 0.45 |
| (2) $|f_{G1}/f_{G2}|$ | 0.72 | 0.79 | 0.57 |
| (3) $f_{G2}/f$ | −0.73 | −0.64 | −1.30 |
| (4) $MG_{G2}$ | 1.36 | 1.47 | 1.22 |
| (5) $f_{FF}/f_{G3}$ | 0.73 | 0.92 | 0.58 |
| (6) $|f_{fo}/f|$ | 0.16 | 0.16 | 0.17 |
| (7) $f_{G2}/f_{fo}$ | 4.55 | 3.93 | 7.71 |
| (8) $vd_{Fp}$ | 94.93 | 94.93 | 94.93 |
| (9) $f_{Fop}/f$ | 0.21 | 0.21 | 0.22 |
| (10) $|(MG_{foback})^2 \times \{(MG_{fo})^2 - 1\}|$ | 4.68 | 4.99 | 4.54 |
| (11) $|MG_{ISback} \times (MG_{IS} - 1)|$ | 2.00 | 2.00 | 2.00 |
| (12) $v_{2GnMAX}$ | 49.6 | 49.6 | 49.6 |
| (13) $|f/r_{G2b}|$ | 1.09 | 0.29 | 0.77 |
| (14) $\Phi_{fo}/\Phi_{La}$ | 0.9 | 0.92 | 0.89 |
| (15) $D_{sfo}/D_{LTL}$ | 0.034 | 0.117 | 0.050 |
| (16) $D_{sfo}/\phi_s$ | 0.31 | 0.74 | 0.41 |

| Conditional expressions | Example 4 | Example 5 |
|---|---|---|
| (1) $f_{FF}/f$ | 0.39 | 0.52 |
| (2) $|f_{G1}/f_{G2}|$ | 0.67 | 1.25 |
| (3) $f_{G2}/f$ | −0.72 | −0.38 |
| (4) $MG_{G2}$ | 1.30 | 1.74 |
| (5) $f_{FF}/f_{G3}$ | 0.49 | 0.80 |
| (6) $|f_{fo}/f|$ | 0.14 | 0.18 |
| (7) $f_{G2}/f_{fo}$ | 5.04 | 2.12 |
| (8) $vd_{Fp}$ | 94.93 | 94.93 |
| (9) $f_{Fop}/f$ | 0.50 | 0.44 |
| (10) $|(MG_{foback})^2 \times \{(MG_{fo})^2 - 1\}|$ | 6.10 | 3.28 |
| (11) $|MG_{ISback} \times (MG_{IS} - 1)|$ | 1.57 | |
| (12) $v_{2GnMAX}$ | 52.32 | 40.76 |
| (13) $|f/r_{G2b}|$ | 1.24 | 0.80 |
| (14) $\Phi_{fo}/\Phi_{La}$ | 0.86 | 0.89 |
| (15) $D_{sfo}/D_{LTL}$ | 0.045 | 0.194 |
| (16) $D_{sfo}/\phi_s$ | 0.36 | 1.25 |

Figure 9:
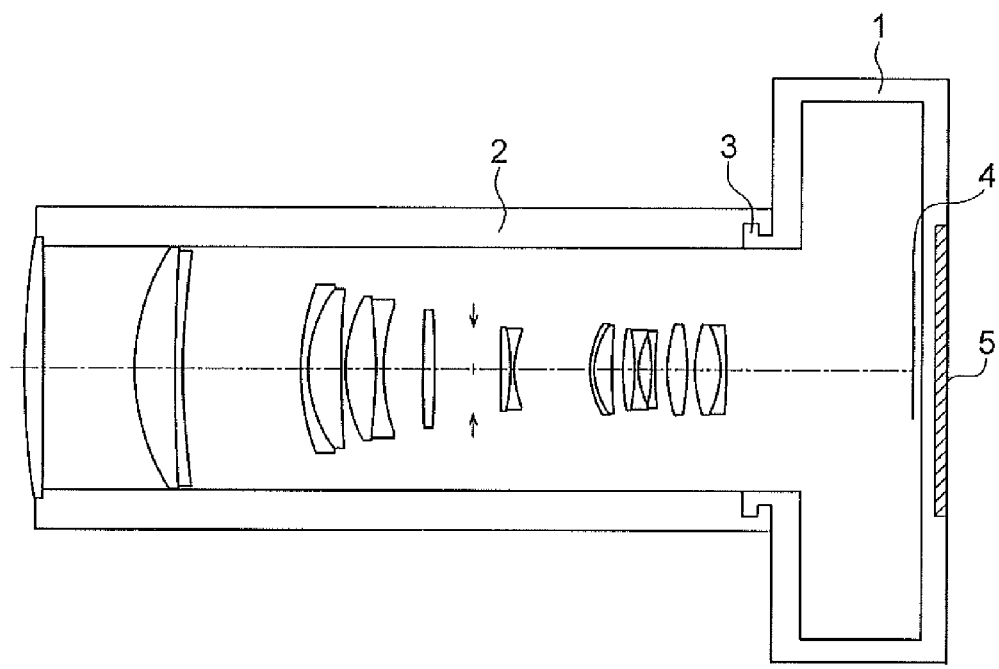
FIG. 9 is a cross-sectional view of a digital camera in which, the single focal length lens system according to the example 1 is incorporated.

FIG. 9 is a cross-sectional view of a single-lens mirrorless camera as an electronic image pickup apparatus. In FIG. 9, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the single focal length lens system according to the present invention described in any one of the examples from the first example to the fifth example is to be used.

Figure 10:
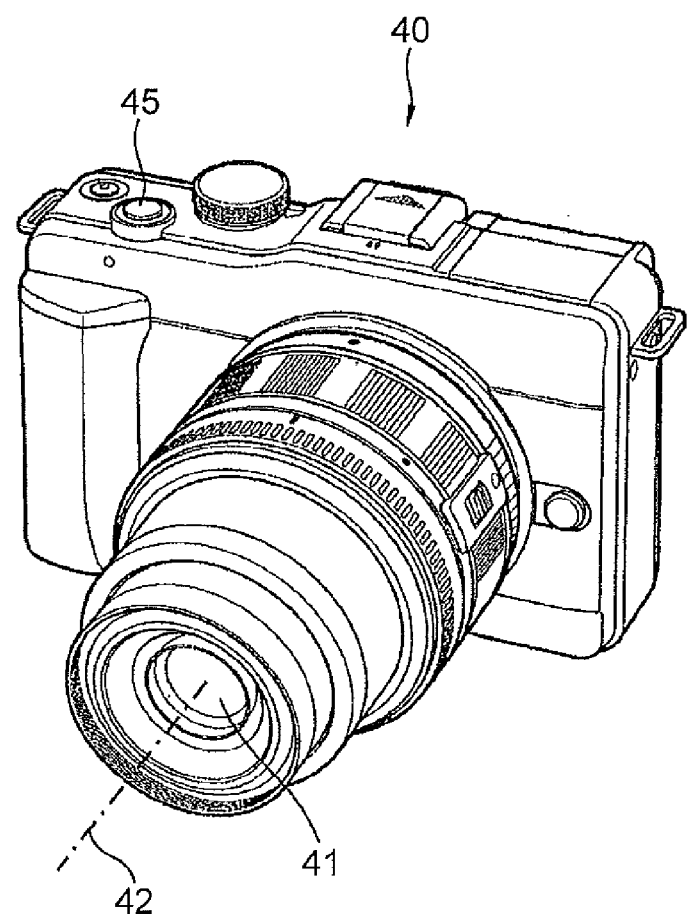
FIG. 10 is a front perspective view showing an appearance of the digital camera.
Figure 11:
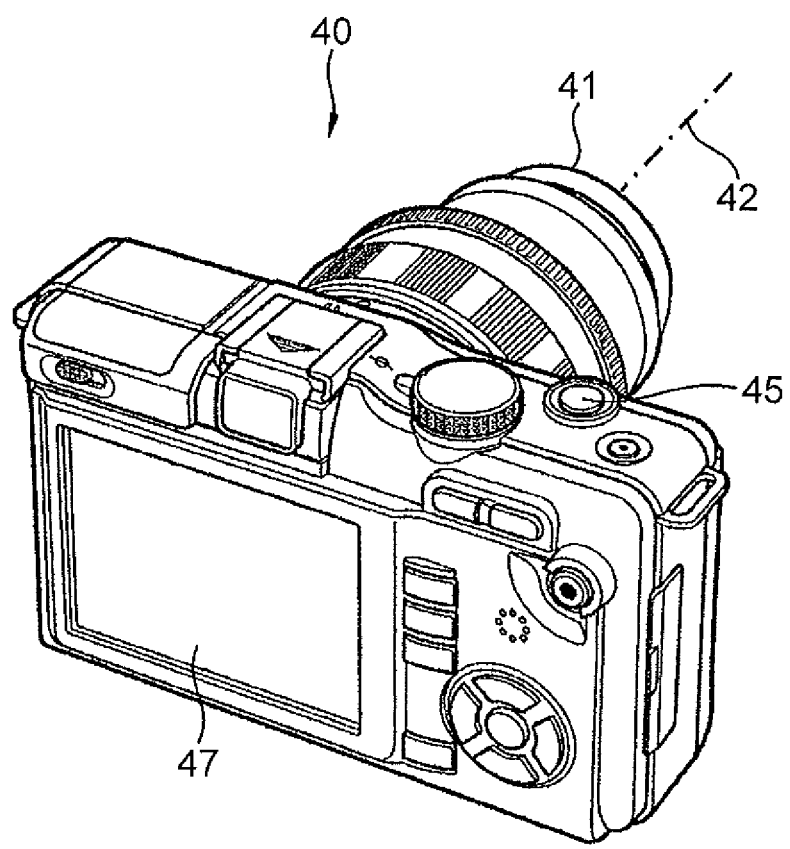
FIG. 11 is a rear perspective view of the digital camera.

FIG. 10 and FIG. 11 are conceptual diagrams of an arrangement of the image pickup apparatus according to the present invention. FIG. 10 is a front perspective view showing an appearance of a digital camera 40 as the image pickup apparatus, and FIG. 11 is a rear perspective view of the digital camera 40. The single focal length lens system according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the single focal length lens system according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

FIG. 12 is a structural block diagram of an internal circuit of main components of the digital camera 40. In the following description, the processing means described above includes for instance, a CDS/ADC section 24, a temporary storage memory 117, and an image processing section 18, and a storage means consists of a storage medium section 19 for example.

As shown in FIG. 12, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM. section in which various image quality parameters are stored in advance, and a RAM section which stores image quality parameters which are selected by an input operation on the operating section 12, from among the image quality parameters which are read from the ROM section.

In the digital camera 40 in which such an arrangement is made, by adopting the single focal length lens system according to the present invention as the photographing optical system 41, since it is possible to make the overall optical system light-weight and to make a focusing speed high, while maintaining a superior focusing performance, the digital camera 40 has a superior mobility, and enables to carry out photography with high resolution. Moreover, it is possible to use the single focal length lens system according to the present invention in an image pickup apparatus of a type having a quick-return mirror.

According to the present invention, it is possible to provide a single focal length lens system which has a superior mobility, and in which, aberrations are corrected favorably, and an image pickup apparatus using the single focal length lens system.

As described heretofore, in the single focal length lens system according to the present invention, since it is possible to shorten the overall length of the optical system and to make the focusing lens unit light-weight, it is possible to realize making the optical system light-weight. Moreover, by making the focusing lens unit light-weight, it is possible to make the focusing unit small-sized and light-weight, and accordingly it becomes easy to make the focusing speed high. For these reasons, the single focal length lens system according to the present invention is suitable for a single focal length lens system which has a superior mobility, and in which, aberrations are corrected favorably. Particularly, the single focal length lens system according to the present invention is useful for a telephoto lens and an ultra-telephoto lens. Moreover, the image pickup apparatus according to the present invention is suitable for an image pickup apparatus which has a superior mobility, and which is capable of carrying out photography with high resolution.

What is claimed is:

1. A single focal length lens system comprising in order from an object side to an image side along an optical axis:
   a front lens unit having a positive refractive power; and
   a rear lens unit, wherein
   the front lens unit includes in order from the object side to the image side, a first lens unit having a positive refractive power, a second lens unit having a negative refractive power, and a third lens unit having a positive refractive power, and
   both the first lens unit and the second lens unit include a positive lens and a negative lens, and
   the rear lens unit includes in order from the object side to the image side, a focusing lens unit and a first predetermined lens unit, and
   the focusing lens unit moves along the optical axis at the time of focusing from an object at infinity to an object at a close distance, and
   the first predetermined lens unit has a refractive power having a sign different from a sign of a refractive power of the focusing lens unit, and does not move in an optical axial direction at the time of focusing, and
   the front lens unit does not include a lens which moves in the optical axial direction,
   wherein a position of the front lens unit is fixed, and
   the rear lens unit does not include a lens which moves in the optical axial direction except at the time of focusing.

2. The single focal length lens system according to claim 1, wherein the rear lens unit has a negative refractive power as a whole.

3. The single focal length lens system according to claim 1, wherein no other lens is disposed between the third lens unit and the focusing lens unit.

4. The single focal length lens system according to claim 1,
   the single focal length lens system includes an aperture stop which is disposed between the third lens unit and the focusing lens unit.

5. The single focal length lens system according to claim 1, wherein the following conditional expression (1) is satisfied:

$$0.20 < f_{FF}/f < 0.90 \qquad (1)$$

where,
$f_{FF}$ denotes a focal length of the front lens unit, and
f denotes a focal length of the single focal length lens system at the time of focusing at an object at infinity.

6. The single focal length lens system according to claim 1, wherein the following conditional expression (2) is satisfied:

$$0.30 < |f_{G1}/f_{G2}| < 2.00 \qquad (2)$$

where,
$f_{G1}$ denotes a focal length of the first lens unit, and
$f_{G2}$ denotes a focal length of the second lens unit.

7. The single focal length lens system according to claim 1, wherein the following conditional expression (3) is satisfied:

$$-2.50 < f_{G2}/f < -0.10 \qquad (3)$$

where,
$f_{G2}$ denotes the foal length of the second lens unit, and
f denotes the focal length of the single focal length lens system at the time of focusing at an object at infinity.

8. The single focal length lens system according to claim 1, wherein the following conditional expression (4) is satisfied:

$$0 < MG_{G2} \qquad (4)$$

where,
$MG_{G2}$ denotes a lateral magnification of the second lens unit at the time of focusing at an object at infinity.

9. The single focal length lens system according to claim 1, wherein the following conditional expression (5) is satisfied:

$$0.20 < f_{FF}/f_{G3} < 2.00 \qquad (5)$$

where,
$f_{FF}$ denotes the focal length of the front lens unit, and
$f_{G3}$ denotes a focal length of the third lens unit.

10. The single focal length lens system according to claim 1, wherein
    the rear lens unit includes a focusing lens unit having a negative refractive power which moves along the optical axis at the time of focusing from an object at infinity to an object at a close distance, and a lens unit having a positive refractive power, and
    only the focusing lens unit moves in the optical axial direction at the time of focusing.

11. The single focal length lens system according to claim 1, wherein the following conditional expression (6) is satisfied:

$$0.06 < |f_{fo}/f| < 0.35 \qquad (6)$$

where,
f denotes the foal length of the single focal length lens system at the time of focusing at an object at infinity, and
$f_{fo}$ denotes a focal length of the focusing lens unit.

12. The single focal length lens system according to claim 1, wherein the following conditional expression (7) is satisfied:

$$1.60 < f_{G2}/f_{fo} < 10.0 \qquad (7)$$

where,
$f_{fo}$ denotes the focal length of the focusing lens unit, and
$f_{G2}$ denotes the focal length of the second lens unit.

13. The single focal length lens system according to claim 1, wherein the front lens unit includes a positive lens which satisfies the following conditional expression (8):

$$80 < vd_{Fp} < 98 \qquad (8)$$

where,
$vd_{Fp}$ denotes Abbe number for one of the positive lenses in the front lens unit.

14. The single focal length lens system according to claim 1, wherein
    the focusing lens unit is the only lens unit which moves along the optical axis at the time of focusing from an object at infinity to an object at a close distance, and
    the rear lens unit includes a lens unit having a positive refractive power which is disposed on the image side of the focusing lens unit, immediately after the focusing lens unit, and
    the following conditional expression (9) is satisfied:

$$0.05 < f_{Fop}/f < 1.00 \qquad (9)$$

where,
$f_{Fop}$ denotes a focal length of the lens unit having a positive refractive power which is disposed on the image side of the focusing lens unit, immediately after the focusing lens unit, and
f denotes the focal length of the single focal length lens system at the time of focusing at an object at infinity.

15. The single focal length lens system according to claim 1, wherein the focusing lens unit is the only lens unit which moves along the optical axis at the time of focusing from an object at infinity to an object at a close distance, and the rear lens unit has a lens unit having a positive refractive power which is disposed on the image side of the focusing lens unit, immediately after the focusing lens unit, and which includes a positive lens and a negative lens.

16. The single focal length lens system according to claim 1, wherein the rear lens unit includes an image-motion correcting lens unit, and the image-motion correcting lens unit moves in a direction different from a direction of the optical axis to reduce an image motion due to shaking of the single focal length lens system.

17. The single focal length lens system according to claim 16, wherein the rear lens unit includes a second predetermined lens unit which is disposed immediately before the image-motion correcting lens unit, and the second predetermined lens unit has a refractive power having a sign different from a sign of a refractive power of the image-motion correcting lens unit.

18. The single focal length lens system according to claim 16, wherein the rear lens unit includes a third predetermined lens unit which is disposed immediately after the image-motion correcting lens unit, and the third predetermined lens unit has a refractive power having a sign different from a sign of the refractive power of the image-motion correcting lens unit.

19. The single focal length lens system according to claim 16, wherein the image-motion correcting lens unit includes a plurality of lenses and a predetermined lens, and the plurality of lenses have a refractive power having a sign same as the sign of the refractive power of the image-motion correcting lens unit, and the predetermined lens has a refractive power having a sign different from the sign of the refractive power of the image-motion correcting lens unit.

20. The single focal length lens system according to claim 16, wherein the rear lens unit includes a second predetermined lens unit which is disposed immediately before the image-motion correcting lens unit and a third predetermined lens unit which is disposed immediately after the image-motion correcting lens unit, and each of the second predetermined lens unit and the third predetermined lens unit has a refractive power having a sign different from the sign of the refractive power of the image-motion correcting lens unit.

21. The single focal length lens system according to claim 16, wherein the image-motion correcting lens unit has a negative refractive power.

22. The single focal length lens system according to claim 1, wherein the focusing lens unit satisfies the following conditional expression (10):

$$0.9 < |(MG_{foback})^2 \times \{(MG_{fo})^2 - 1\}| < 3.50 \quad (10)$$

where, $MG_{fo}$ denotes a lateral magnification of the focusing lens unit in an arbitrary focused state, and $MG_{foback}$ denotes a lateral magnification of the overall optical system between the focusing lens unit and the image plane, in an arbitrary focused state.

23. The single focal length lens system according to claim 1, wherein the single focal length lens system includes an image-motion correcting lens unit which satisfies the following conditional expression (11):

$$2.00 < |MG_{ISback} \times (MG_{IS} \times 1)| < 7.50 \quad (11)$$

where, $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

24. The single focal length lens system according to claim 1, wherein the second lens unit includes a negative lens which satisfies the following conditional expression (12):

$$20.0 < v_{G2nMAX} < 65.0 \quad (12)$$

where, $v_{G2nMAX}$ denotes a maximum Abbe number from among Abbe numbers for the negative lenses in the second lens unit.

25. The single focal length lens system according to claim 1, wherein the third lens unit is a lens unit which is disposed nearest to the image in the front lens unit.

26. The single focal length lens system according to claim 1, wherein the total number of lenses included in the focusing lens unit is not more than two.

27. The single focal length lens system according to claim 1, wherein the focusing lens unit consists of two lenses namely, a positive lens and a negative lens.

28. The single focal length lens system according to claim 1, wherein the focusing lens unit has a negative refractive power, and a lens unit which does not move in the optical axial direction at the time of focusing is a lens unit having a positive refractive power of which, a position is fixed all the time, and the rear lens unit includes a image-motion correcting lens unit and the lens unit having a positive refractive power of which, the position is fixed all the time, and the image-motion correcting lens unit is disposed on the image side of the lens unit having a positive refractive power, of which, the position is fixed all the time, and moves in a direction different from a direction of the optical axis to reduce an image motion due to shaking of the single focal length lens system, and the lens unit having a positive refractive power of which, the position is fixed all the time, is disposed on the image side of the image-motion correcting lens unit.

29. The single focal length lens system according to claim 1, wherein only the focusing lens unit is a lens unit which is movable in the optical axial direction.

30. The single focal length lens system according to claim 16, wherein only the focusing lens unit and a image-motion correcting lens unit are the lens units which are movable.

31. The single focal length lens system according to claim 1, wherein the following conditional expression (13) is satisfied:

$$0 \le |f/r_{G2b}| < 7.0 \quad (13)$$

where, f denotes the focal length of the single focal length lens system at the time of focusing at an object at infinity, and $r_{G2b}$ denotes a paraxial radius of curvature of a lens surface on the object side of the focusing lens unit, immediately before the focusing lens unit.

32. The single focal length lens system according to claim 1, wherein the following conditional expression (14) is satisfied:

$$0.5 \leq \phi_{fo}/\phi_{La} \leq 0.92 \quad (14)$$

where, $\phi_{fo}$ denotes a maximum effective aperture from among effective apertures of lenses in the focusing lens unit, and $\phi_{La}$ denotes a maximum effective aperture of a lens positioned nearest to the image in the single focal length lens system.

33. The single focal length lens system according to claim 1, wherein the following conditional expression (15) is satisfied:

$$0.023 \leq D_{sfo}/D_{LTL} \leq 0.110 \quad (15)$$

where, $D_{sfo}$ denotes a distance on the optical axis from the aperture stop up to a lens surface nearest to an object of the focusing lens unit, $D_{LTL}$ denotes a distance on the optical axis from a lens surface nearest to the object of the single focal length lens system up to an image plane, and both $D_{sfo}$ and $D_{LTL}$ are distances at the time of focusing at an object at infinity.

34. The single focal length lens system according to claim 1, wherein the following conditional expression (16) is satisfied:

$$0.2 \leq D_{sfo}/\Phi_s \leq 0.8 \quad (16)$$

where, $D_{sfo}$ denotes the distance on the optical axis from the aperture stop up to a lens surface nearest to an object of the focusing lens unit, and is a distance at the time of focusing at an object at infinity, and $\Phi_s$ denotes a maximum diameter of the aperture stop.

35. The single focal length lens system according to claim 1, wherein an optical system positioned on the image side of the focusing lens unit includes at least two positive lenses and one negative lens.

36. An image pickup apparatus comprising:
an optical system; and
an image pickup element which has an image pickup surface, and which converts an image formed on the image pickup surface by the optical system to an electric signal, wherein
the optical system is a single focal length lens system according to claim 1.

37. A single focal length lens system comprising in order from an object side to an image side along an optical axis:
a front lens unit having a positive refractive power; and
a rear lens unit, wherein
the front lens unit includes in order from the object side to the image side, a first lens unit having a positive refractive power, a second lens unit having a negative refractive power, and a third lens unit having a positive refractive power, and
both the first lens unit and the second lens unit include a positive lens and a negative lens, and
the rear lens unit includes in order from the object side to the image side, a focusing lens unit and a first predetermined lens unit, and
the focusing lens unit moves along the optical axis at the time of focusing from an object at infinity to an object at a close distance, and
the first predetermined lens unit has a refractive power having a sign different from a sign of a refractive power of the focusing lens unit, and does not move in an optical axial direction at the time of focusing, and
the front lens unit does not include a lens which moves in the optical axial direction, and
the rear lens unit does not include a lens which moves in the optical axial direction except at the time of focusing, and
the rear lens unit includes a focusing lens unit having a negative refractive power which moves along the optical axis at the time of focusing from an object at infinity to an object at a close distance, and a lens unit having a positive refractive power, and
only the focusing lens unit moves in the optical axial direction at the time of focusing.

38. A single focal length lens system comprising in order from an object side to an image side along an optical axis:
a front lens unit having a positive refractive power; and
a rear lens unit, wherein
the front lens unit includes in order from the object side to the image side, a first lens unit having a positive refractive power, a second lens unit having a negative refractive power, and a third lens unit having a positive refractive power, and
both the first lens unit and the second lens unit include a positive lens and a negative lens, and
the rear lens unit includes in order from the object side to the image side, a focusing lens unit and a first predetermined lens unit, and
the focusing lens unit moves along the optical axis at the time of focusing from an object at infinity to an object at a close distance, and
the first predetermined lens unit has a refractive power having a sign different from a sign of a refractive power of the focusing lens unit, and does not move in an optical axial direction at the time of focusing, and
the front lens unit does not include a lens which moves in the optical axial direction, and
the rear lens unit does not include a lens which moves in the optical axial direction except at the time of focusing, and
the focusing lens unit is the only lens unit which moves along the optical axis at the time of focusing from an object at infinity to an object at a close distance, and
the rear lens unit has a lens unit having a positive refractive power which is disposed on the image side of the focusing lens unit, immediately after the focusing lens unit, and which includes a positive lens and a negative lens.

39. A single focal length lens system comprising in order from an object side to an image side along an optical axis:
a front lens unit having a positive refractive power; and
a rear lens unit, wherein
the front lens unit includes in order from the object side to the image side, a first lens unit having a positive refractive power, a second lens unit having a negative refractive power, and a third lens unit having a positive refractive power, and
both the first lens unit and the second lens unit include a positive lens and a negative lens, and
the rear lens unit includes in order from the object side to the image side, a focusing lens unit and a first predetermined lens unit, and
the focusing lens unit moves along the optical axis at the time of focusing from an object at infinity to an object at a close distance, and the first predetermined lens unit has a refractive power having a sign different from a sign of a refractive power of the focusing lens unit, and does not move in an optical axial direction at the time of focusing, and the front lens unit does not include a lens which moves in the optical axial direction, and the rear lens unit does not include a lens which moves in the optical axial direction except at the time of focusing, and the rear lens unit includes an image-motion correcting lens unit, and the image-motion correcting lens unit moves in a direction different from a direction of the optical axis to reduce an image motion due to shaking of the single focal length lens system.

40. A single focal length lens system comprising in order from an object side to an image side along an optical axis:

a front lens unit having a positive refractive power; and a rear lens unit, wherein the front lens unit includes in order from the object side to the image side, a first lens unit having a positive refractive power, a second lens unit having a negative refractive power, and a third lens unit having a positive refractive power, and both the first lens unit and the second lens unit include a positive lens and a negative lens, and the rear lens unit includes in order from the object side to the image side, a focusing lens unit and a first predetermined lens unit, and the focusing lens unit moves along the optical axis at the time of focusing from an object at infinity to an object at a close distance, and the first predetermined lens unit has a refractive power having a sign different from a sign of a refractive power of the focusing lens unit, and does not move in an optical axial direction at the time of focusing, and the front lens unit does not include a lens which moves in the optical axial direction, and the rear lens unit does not include a lens which moves in the optical axial direction except at the time of focusing, and the focusing lens unit satisfies the following conditional expression (10):

$$0.9<|(MG_{foback})^2 \times \{(MG_{fo})^2-1\}|<3.50 \quad (10)$$

where, $MG_{fo}$ denotes a lateral magnification of the focusing lens unit in an arbitrary focused state, and $MG_{foback}$ denotes a lateral magnification of the overall optical system between the focusing lens unit and the image plane, in an arbitrary focused state.

41. A single focal length lens system comprising in order from an object side to an image side along an optical axis:

a front lens unit having a positive refractive power; and a rear lens unit, wherein the front lens unit includes in order from the object side to the image side, a first lens unit having a positive refractive power, a second lens unit having a negative refractive power, and a third lens unit having a positive refractive power, and both the first lens unit and the second lens unit include a positive lens and a negative lens, and the rear lens unit includes in order from the object side to the image side, a focusing lens unit and a first predetermined lens unit, and the focusing lens unit moves along the optical axis at the time of focusing from an object at infinity to an object at a close distance, and the first predetermined lens unit has a refractive power having a sign different from a sign of a refractive power of the focusing lens unit, and does not move in an optical axial direction at the time of focusing, and the front lens unit does not include a lens which moves in the optical axial direction, and the rear lens unit does not include a lens which moves in the optical axial direction except at the time of focusing, and the single focal length lens system includes an image-motion correcting lens unit which satisfies the following conditional expression (11):

$$2.00<|MG_{ISback} \times (MG_{IS} \times 1)|<7.50 \quad (11)$$

where, $MG_{IS}$ denotes a lateral magnification of the image-motion correcting lens unit in an arbitrary focused state, and $MG_{ISback}$ denotes a lateral magnification of an overall optical system between the image-motion correcting lens unit and the image plane, in an arbitrary focused state.

42. A single focal length lens system comprising in order from an object side to an image side along an optical axis:

a front lens unit having a positive refractive power; and a rear lens unit, wherein the front lens unit includes in order from the object side to the image side, a first lens unit having a positive refractive power, a second lens unit having a negative refractive power, and a third lens unit having a positive refractive power, and both the first lens unit and the second lens unit include a positive lens and a negative lens, and the rear lens unit includes in order from the object side to the image side, a focusing lens unit and a first predetermined lens unit, and the focusing lens unit moves along the optical axis at the time of focusing from an object at infinity to an object at a close distance, and the first predetermined lens unit has a refractive power having a sign different from a sign of a refractive power of the focusing lens unit, and does not move in an optical axial direction at the time of focusing, and the front lens unit does not include a lens which moves in the optical axial direction, and the rear lens unit does not include a lens which moves in the optical axial direction except at the time of focusing, and the total number of lenses included in the focusing lens unit is not more than two.

43. A single focal length lens system comprising in order from an object side to an image side along an optical axis:

a front lens unit having a positive refractive power; and a rear lens unit, wherein the front lens unit includes in order from the object side to the image side, a first lens unit having a positive refractive power, a second lens unit having a negative refractive power, and a third lens unit having a positive refractive power, and both the first lens unit and the second lens unit include a positive lens and a negative lens, and the rear lens unit includes in order from the object side to the image side, a focusing lens unit and a first predetermined lens unit, and the focusing lens unit moves along the optical axis at the time of focusing from an object at infinity to an object at a close distance, and the first predetermined lens unit has a refractive power having a sign different from a sign of a refractive power of the focusing lens unit, and does not move in an optical axial direction at the time of focusing, and the front lens unit does not include a lens which moves in the optical axial direction, and the rear lens unit does not include a lens which moves in the optical axial direction except at the time of focusing, and the focusing lens unit consists of two lenses namely, a positive lens and a negative lens.

44. A single focal length lens system comprising in order from an object side to an image side along an optical axis:
a front lens unit having a positive refractive power; and
a rear lens unit, wherein
the front lens unit includes in order from the object side to the image side, a first lens unit having a positive refractive power, a second lens unit having a negative refractive power, and a third lens unit having a positive refractive power, and
both the first lens unit and the second lens unit include a positive lens and a negative lens, and
the rear lens unit includes in order from the object side to the image side, a focusing lens unit and a first predetermined lens unit, and
the focusing lens unit moves along the optical axis at the time of focusing from an object at infinity to an object at a close distance, and
the first predetermined lens unit has a refractive power having a sign different from a sign of a refractive power of the focusing lens unit, and does not move in an optical axial direction at the time of focusing, and
the front lens unit does not include a lens which moves in the optical axial direction, and
the rear lens unit does not include a lens which moves in the optical axial direction except at the time of focusing, and
the focusing lens unit has a negative refractive power, and
a lens unit which does not move in the optical axial direction at the time of focusing is a lens unit having a positive refractive power of which, a position is fixed all the time, and
the rear lens unit includes a image-motion correcting lens unit and the lens unit having a positive refractive power of which, the position is fixed all the time, and
the image-motion correcting lens unit is disposed on the image side of the lens unit having a positive refractive power, of which, the position is fixed all the time, and moves in a direction different from a direction of the optical axis to reduce an image motion due to shaking of the single focal length lens system, and
the lens unit having a positive refractive power of which, the position is fixed all the time, is disposed on the image side of the image-motion correcting lens unit.

45. A single focal length lens system comprising in order from an object side to an image side along an optical axis:
a front lens unit having a positive refractive power; and
a rear lens unit, wherein
the front lens unit includes in order from the object side to the image side, a first lens unit having a positive refractive power, a second lens unit having a negative refractive power, and a third lens unit having a positive refractive power, and
both the first lens unit and the second lens unit include a positive lens and a negative lens, and
the rear lens unit includes in order from the object side to the image side, a focusing lens unit and a first predetermined lens unit, and
the focusing lens unit moves along the optical axis at the time of focusing from an object at infinity to an object at a close distance, and
the first predetermined lens unit has a refractive power having a sign different from a sign of a refractive power of the focusing lens unit, and does not move in an optical axial direction at the time of focusing, and
the front lens unit does not include a lens which moves in the optical axial direction, and
the rear lens unit does not include a lens which moves in the optical axial direction except at the time of focusing, and
the following conditional expression (15) is satisfied:

$$0.023 \leq D_{sfo}/D_{LTL} \leq 0.110 \tag{15}$$

where,
$D_{sfo}$ denotes a distance on the optical axis from the aperture stop up to a lens surface nearest to an object of the focusing lens unit,
$D_{LTL}$ denotes a distance on the optical axis from a lens surface nearest to the object of the single focal length lens system up to an image plane, and
both $D_{sfo}$ and $D_{LTL}$ are distances at the time of focusing at an object at infinity.

46. A single focal length lens system comprising in order from an object side to an image side along an optical axis:
a front lens unit having a positive refractive power; and
a rear lens unit, wherein
the front lens unit includes in order from the object side to the image side, a first lens unit having a positive refractive power, a second lens unit having a negative refractive power, and a third lens unit having a positive refractive power, and
both the first lens unit and the second lens unit include a positive lens and a negative lens, and
the rear lens unit includes in order from the object side to the image side, a focusing lens unit and a first predetermined lens unit, and
the focusing lens unit moves along the optical axis at the time of focusing from an object at infinity to an object at a close distance, and
the first predetermined lens unit has a refractive power having a sign different from a sign of a refractive power of the focusing lens unit, and does not move in an optical axial direction at the time of focusing, and
the front lens unit does not include a lens which moves in the optical axial direction, and
the rear lens unit does not include a lens which moves in the optical axial direction except at the time of focusing, and
the following conditional expression (16) is satisfied:

$$0.2 \leq D_{sfo}/\phi_s \leq 0.8 \tag{16}$$

where,
$D_{sfo}$ denotes the distance on the optical axis from the aperture stop up to a lens surface nearest to an object of the focusing lens unit, and is a distance at the time of focusing at an object at infinity, and
$\phi_s$ denotes a maximum diameter of the aperture stop.

* * * * *